US009652827B2

(12) United States Patent
Mendlovic et al.

(10) Patent No.: US 9,652,827 B2
(45) Date of Patent: May 16, 2017

(54) SYSTEM AND METHOD FOR COLOR IMAGE ACQUISITION

(71) Applicant: TECHNOLOGY INNOVATION MOMENTUM FUND (ISRAEL) LIMITED PARTNERSHIP, Tel Aviv (IL)

(72) Inventors: David Mendlovic, Tel Aviv (IL); Ariel Raz, Tel Aviv (IL)

(73) Assignee: TECHNOLOGY INNOVATION MOMENTUM FUND (ISRAEL) LIMITED PARTNERSHIP, Tel Aviv (IL)

( * ) Notice: Subject to any disclaimer, the term of this patent is extended or adjusted under 35 U.S.C. 154(b) by 0 days.

(21) Appl. No.: 14/392,143

(22) PCT Filed: Jun. 24, 2014

(86) PCT No.: PCT/IL2014/050566
§ 371 (c)(1),
(2) Date: Dec. 23, 2015

(87) PCT Pub. No.: WO2014/207742
PCT Pub. Date: Dec. 31, 2014

(65) Prior Publication Data
US 2016/0171653 A1    Jun. 16, 2016

Related U.S. Application Data

(60) Provisional application No. 61/838,525, filed on Jun. 24, 2013.

(51) Int. Cl.
H04N 5/225 (2006.01)
H04N 9/47 (2006.01)
(Continued)

(52) U.S. Cl.
CPC ............... *G06T 3/4015* (2013.01); *G01J 3/26* (2013.01); *G01J 3/51* (2013.01); *G02B 26/001* (2013.01); *H04N 9/045* (2013.01)

(58) Field of Classification Search
CPC . C23C 14/12; H01L 51/0011; H01L 51/5064; H01L 51/5265; G01N 21/21; G01N 21/359
See application file for complete search history.

(56) References Cited

U.S. PATENT DOCUMENTS 8,039,816 B2   10/2011   Morishita et al.
2005/0027166 A1  2/2005   Matsumoto et al.
(Continued)

FOREIGN PATENT DOCUMENTS

CN    1875638 A    12/2006
CN   102148999 A    8/2011
(Continued)

*Primary Examiner* — Trumg Diep
(74) *Attorney, Agent, or Firm* — Browdy and Neimark, PLLC

(57) ABSTRACT

An imaging system color image acquisition including: an image sensor; a tunable spectral filter arranged in an optical path of light propagation towards the image sensor; and a controller connected to the image sensor and to the tunable spectral filter. The controller is configured and operable for generating a colored image by sequentially operating the tunable spectral filter for sequentially filtering light passing towards the image sensor with three or more different spectral filtering curves during three or more corresponding integration time durations. The tunable spectral filter is configured, as an etalon and includes a pair of reflective surfaces. At least one of the reflective surfaces includes a layer of high refractive index of at least n=2.3 or even higher than 3, or a layer of low refractive index, smaller than n=1. The configuration of the etalon provide wide transmission peaks of the spectral curves with full-width-half maximum (Continued)

(FWHM) in the range of about 50 to 80 nm, free spectral range (FSR) of at least 300 nm, and thickness of the etalon in the order to 1 mm or even less.

21 Claims, 9 Drawing Sheets

(51) Int. Cl.
*G06T 3/40* (2006.01)
*G01J 3/26* (2006.01)
*G01J 3/51* (2006.01)
*H04N 9/04* (2006.01)
*G02B 26/00* (2006.01)

(56) References Cited

U.S. PATENT DOCUMENTS

| | | | |
|---|---|---|---|
| 2005/0029437 A1 | 2/2005 | Hasegawa et al. | |
| 2007/0116078 A1* | 5/2007 | Kim | H01S 5/041 372/50.124 |
| 2007/0153866 A1* | 7/2007 | Shchegrov | G02B 27/102 372/50.124 |
| 2009/0236525 A1 | 9/2009 | Mitra et al. | |
| 2010/0135537 A1* | 6/2010 | Ye | D21B 1/325 382/110 |
| 2012/0008141 A1* | 1/2012 | Matsushita | G02B 5/284 356/326 |
| 2012/0200682 A1* | 8/2012 | Mestha | G06K 9/0063 348/61 |
| 2014/0092282 A1* | 4/2014 | Morishita | G01J 3/26 348/262 |

FOREIGN PATENT DOCUMENTS

| | | |
|---|---|---|
| CN | 102466516 A | 5/2012 |
| CN | 102741671 A | 10/2012 |
| EP | 0693683 A1 | 1/1996 |
| JP | 2000162043 A | 6/2000 |
| JP | 2008125934 A | 6/2008 |
| JP | 2009033222 A | 2/2009 |
| WO | 0128224 A2 | 4/2001 |
| WO | 2005046248 A1 | 5/2005 |
| WO | 2011064403 A1 | 6/2011 |

* cited by examiner

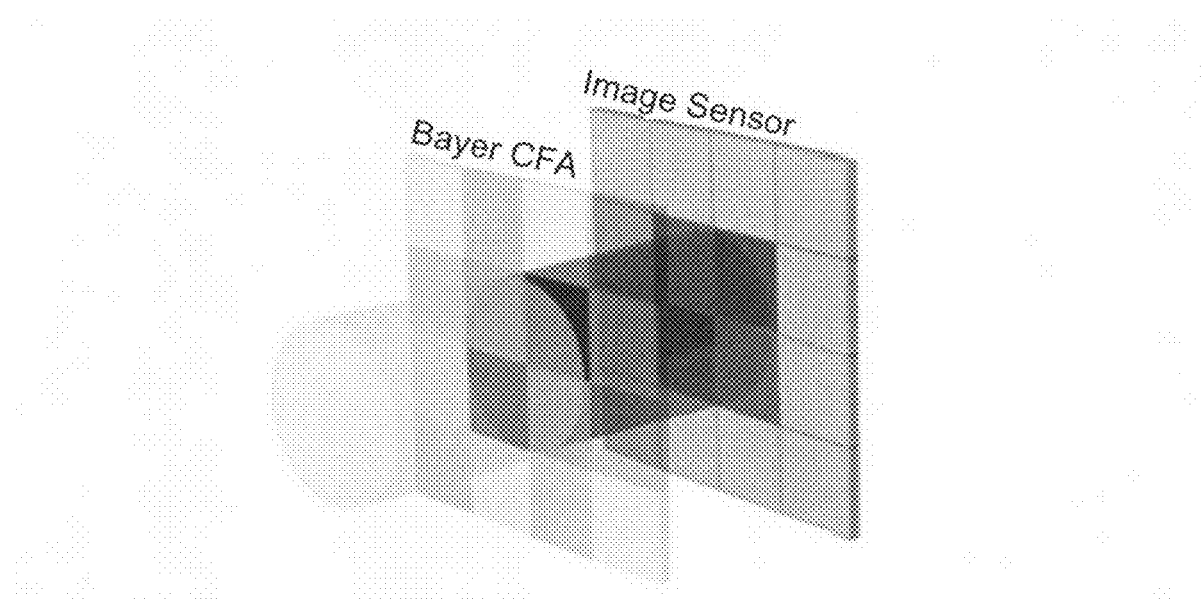
Fig. 1A (General Art)
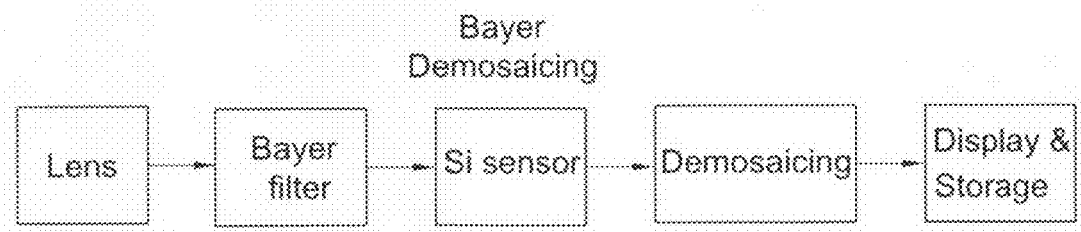
Fig. 1B (General Art)
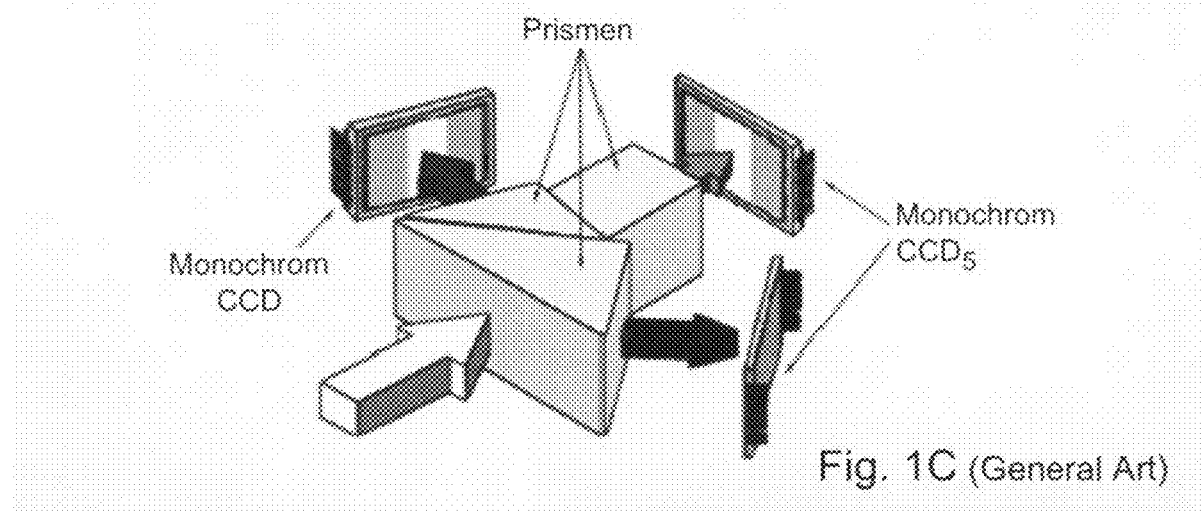
Fig. 1C (General Art)

SYSTEM AND METHOD FOR COLOR IMAGE ACQUISITION

TECHNOLOGICAL FIELD

The invention relates to color image acquisition and more specifically provides a system and method for spectral filtration of light for creating colored images.

BACKGROUND

There are several known techniques of producing a color image by a digital camera. Conventionally, color imaging is based on detecting three spectral ranges by filters respectively centered in the red (R), green (G) and blue (B) spectral zones.

One approach for acquisition of colored images, which became the industry standard, utilizes an arrangement of set of fixed color filters (i.e. color filter array (CFA)) which are placed in front of a monochrome sensor such that each pixel of the sensor measures the intensity of only one spectral component of the incident light, out of the three RGB components which are needed for producing a color image. For example, a Bayer's array is a specific CFA of this type, which is commonly used for acquisition of RGB images (see FIG. 1A). In order to produce a color image (in which each pixel contains information about all the three RGB components, the remaining two color components, which are not measured by the pixel, are calculated based on the values of these components measured by adjacent pixels. This process, known as "de-mosaicing", may be performed by various well-known algorithms.

An alternative technique for acquisition of color images utilizes three monochromatic sensors and a spectral beam splitter component that splits the incident light, by its color, and directs three RGB components of the incident light to the three image sensors respectively. A system configured in accordance with this technique is illustrated in a self explanatory manner in FIG. 1C (image is taken from www-.zeiss.de).

Yet an additional technique for acquisition of color images utilizes a color sensor in which each pixel is adapted for measuring all three RGB colors simultaneously, for example a Foveon® X3 sensor.

GENERAL DESCRIPTION

The present invention provides a novel technique for acquisition of color images. According to the invention colored images are created by sequential acquisition and superposing of three or more narrow band images. For example, sequential acquisition and superposing of three Red, Green and Blue images, or sequential acquisition and superposing of four Red, Green, Blue and Infra-Red (IR) images (typically the IR images are in the Near-IR (NIR) wavelength band being in the range of about 700-1200 nm). Also, in some cases the technique of the present invention is used to capture rich color images including color information on more than three shades of colors in the visual spectrum (400-700 nm) and optionally on one or more shades in the IR spectrum.

In this regard the following should be noted with regard to conventional techniques for capturing color images. The most common conventional techniques which utilize the spatial Color Filter Array (CFA), filter the color of light reaching the pixels (i.e. such that some pixels in the sensor sense the blue light, some the red and some the green). As a result, the true spatial resolution obtained by such techniques is much lower than the resolution of the sensor used (e.g. by a factor ranging between ½ and ¼), and typically spatial interpolation is utilized to complete/estimate the color information in the image. Also, as the spectral properties of the CFA are generally fixed, such techniques are limited in the number of colors and the spectral content of light measured by the pixels. In techniques utilizing the color sensors (i.e. where each pixel simultaneously measures the three RGB colors, such as the Foveon X3), the number of colors and the spectral content is also generally fixed. Also, in such color sensors, the size of the pixels is substantially larger and noisier than those of standard Silicon-based CMOS and/or CCD sensors, and accordingly yields images of inferior resolution and SNR for the same sensor size.

The present invention provides a method and system capable of producing high quality colored images having a spatial resolution of each color matching that of the image sensor used. In addition the present invention provides a method and a system for capturing rich-color images which may have more than three color shades and/or may range over a wide spectrum including the visual spectrum and the at least parts of the NIR spectrum. Further, the invention provides a technique for adaptive color acquisition in which the time for acquiring each of the colors may be adaptively set in-situ based on the color content in the scenery being imaged (e.g. by utilizing an preliminary/calibration stage in which the color intensity in the imaged scene is estimated and the integration times for each color is accordingly set/selected (this stage may, for example, be performed together/simultaneously during the camera autofocus). To this end the integration time for imaging each color, as well as the number and spectral profiles of the colors to be imaged, may be adaptively determined based on the imaged scene so as to reduce the total exposure time while reducing the noise in the captured image (by making the most out of the given imaged spectrum as well as dynamic range and sensitivity of the sensor), while optionally also capturing rich-colorful images with specifically selected color shades optimized for the scene.

This is achieved by utilizing a controllable spectral filter placed in an optical path of light propagation towards an appropriate (e.g. monochromatic) image sensor and controlling the spectral filter to sequentially pass light of three or more wide spectral bands while monochrome images/frames of these three or more spectral bands are acquired from the sensor. To this end, conventional CFA techniques, which provide relatively low spatial color resolution, are replaced by temporal color sampling in the present invention. This, on the one hand, improves spatial resolution of the final color image, and on the other hand allows adaptive color imaging with flexibility in the selection of acquired colors and/or acquisition/integration times per color.

For example in some cases several frames of arbitrary colors (e.g. non-standard colors) may be captured and processed utilizing color interpolation to produce a colored image with the standard color palette. In low light sceneries, a set of frames of colors in the visible range, such as RGB, may be captured plus one or more frames in the NIR spectrum. The frames in the visible and NIR may then be processed to produce enhanced image of the low-light scene. Also, in case some of the captured frames of the visible and/or NIR colors present too low intensities, additional frames of similar or same colors may be captured (to compensate for the low intensities of the first frames. For example, when during processing of a Red and Green frames it is determined that the intensity of these frames is below a certain threshold, frames of similar colors may be recaptured possibly with longer integration times.

Particularly, as further described in more detail below, the present invention provides a novel adaptive color imaging method for selecting different integration times for each color and/or for selection of the particular colors to be acquired and possibly for capturing multiple (two or more) images of similar colors to attain more information about colors associated with low intensities. Accordingly, the technique of the present invention enables to obtain better quality images, for a given sensor, while improving the image resolution and the ratio of signal to noise in the images.

In this connection it should be noted that the term monochrome/monochromatic images are used herein to designate gray scale image/data (e.g. bitmap) in which each pixel of the monochrome image corresponds to/has a gray scale value, designating the intensity of the color/spectral-profile associated with the monochrome image. The term color should be understood as relating to a certain spectral profile within the visual and possibly also the NIR spectral bands. To this end, a colored image/frame is to be understood as an image in which each pixel represents the intensities of several (typically three or more) colors.

The technique of the invention is suitable for use in compact imager systems. This is facilitated by novel design of a controllable spectral filter of an etalon type which is configured with a sufficiently thin form factor and which can be fitted in the optical system/path of even compact camera modules. To this end, it should be understood that the spectral filter of the invention is on the one hand designed with a thin form factor (whose thickness in some embodiments does not exceed 1 mm) while on the other hand its optical properties, and particularly its Free Spectral Range (FSR) and Finesse, are optimized for imaging applications. Specifically, the controllable spectral filter is configured to provide sufficiently wide free spectral range (FSR) (e.g. of at least 300 nm or more) to allow good spectral separation between colors (namely such that for example when sampling the red color, light components in the blue spectral regime are not passed through the filter and do not interfere with measurement of the red light components).

In particular, in some embodiments, the tunable etalon is configured for tunability over a relatively wide spectral range, for example ranging from the blue, in the short visual wavelengths (e.g. about 400 nm), and up to long wavelengths in the NIR (e.g. up to about 1100 or 1200 nm). Yet, even in cases where the etalon is configured for selective filtering of light in a wide band extending over the visual and NIR spectrum, the etalon is also configured with sufficient FSR of at least 300 nm such that when tuned to passing the light in the NIR, light in the green and blue spectral regimes is substantially blocked/attenuated.

Furthermore, in order to enable generation of accurate color images, the etalon is configured with low finesse (namely sufficiently wide spectral transmission peak of having full-width half maximum of about 50-80 nm) such that when tuned to a certain color (wavelength) not only monochromatic light of that color is passed to the sensor, but a variety of shades of that color are also passed to the sensor. This, on the one hand provides for creating images with accurate (e.g. faithful) colors, and on the other hand allows sufficient light to pass to the sensor.

In this regard, it should be noted that conventional etalons, which are typically used for optical communication purposes, are generally not suitable for the purposes of the present invention. This is at least because they are generally configured for passing substantially monochromatic light of a predetermined wavelength (i.e. configured with high finesse), which would result in insufficient light intensity reaching the sensor and in non-accurate colors if used for imaging proposes.

Thus, according to a broad aspect of the present invention there is provided an imaging system for acquisition of color images. The imaging system includes: an image sensor (e.g. monochromatic image sensor); a tunable spectral filter arranged in an optical path of light propagation towards the image sensor; and a controller connected to the image sensor and to the tunable spectral filter. The controller (e.g. control system) is adapted for generating a colored image by sequentially operating the tunable spectral filter for sequentially filtering light passing towards the image sensor with three or more different spectral filtering curves during three or more corresponding integration time durations. According to certain embodiments of the invention the tunable spectral filter is configured as an etalon comprising a pair of reflective surfaces, and wherein at least one of the reflective surfaces comprises at least one of the following: (i) a layer of high refractive index of at least n=2.3, or (ii) a layer of low refractive index, smaller than n=1; thereby providing wide transmission peaks of the spectral curves with full-width-half maximum (FWHM) in the range of about 50 to 80 nm, free spectral range of at least 300 nm and thickness of the etalon not exceeding 1 mm.

In some embodiments of the present invention the controller is configured and operable for operating the sensor during the three or more integration time durations for acquiring three or more images of the light of the three or more spectral filtering curves respectively. Also the controller is configured and operable for receiving and processing readout data indicative of the three or more images from the sensor and generating data indicative of a colored image including information on intensities of at least three colors in each pixel of the colored image.

In some embodiments of the present invention the durations of the integration times are defined per each spectral filtering curve (i.e. per each color). Alternatively or additionally, the controller may be configured and operable for adaptively determining at least one of the following: the three or more different spectral filtering curves, and the durations of the integration times, based on the scene to be imaged. To this end, in some embodiments of the present invention the controller is operable for carrying out a calibration stage prior to the generation of the colored image. The calibration stage includes:

tuning the spectral filter to at least one spectral filtering curve of the three or more different spectral filtering curves, obtaining and processing readout data from the sensor corresponding to the light filtered by the at least one spectral filtering curve, and estimating the intensity of light with the spectral filtering curve in the scene;

utilizing the intensity to determine an optimized integration time duration of capturing an image of light filtered by the spectral filtering curve.

In certain embodiments, the controller is configured and operable for estimating brightness of at least one image of the three or more images of the three or more spectral filtering curves, and upon determining the brightness is below a certain threshold, operating the tunable spectral filter and the imager for capturing another image of a similar or same spectral filtering curve.

In some embodiments of the present invention the processing of the readout data of the three or more images from the sensor to generate the colored image includes applying image fusion processing to the three or more images. The image fusion algorithms include at least one of the following:

processing the three or more images to determine spatial registration between the images;

normalizing the respective intensities of the three or more images based on at least one of the following: the integration time durations of the respective images, the spectral filtering-curves corresponding to the images, and a sensitivity of the sensor for wavelengths corresponding to the spectral filtering-curves; and merging the data from the three or more images to generate data indicative of the colored image.

In some embodiments the merging includes color interpolation for converting between the spectral filtering-curves associated with the three or more images and a certain color palette associated with the colored image.

In some embodiments of the present invention, the three or more different spectral filtering curves include three RGB spectral filtering curves in the visual spectral regime.

Alternatively or additionally, in some embodiments of the present invention the three or more spectral filtering curves include at least three spectral filtering curves corresponding to at least three specific colors in the visual spectral regime and at least one additional spectral filtering curve adapted for transmitting relatively high light intensity through the filter as compared to a light intensity transmitted through the filter when tuned to the at least three spectral filtering curves.

In certain embodiments/implementations of the present invention, the at least one additional spectral filtering curve includes at least one of the following:

(i) a white spectral curve enabling (used-for) obtaining high intensity images in bight imaging conditions (e.g. day light imaging); and (ii) a NIR spectral curve used for obtaining high intensity images in dark (e.g. night) imaging conditions.

These may be used in various imaging scenes to capture high intensity images.

To this end, in certain embodiments the system is configured and operable for generating the colored image by carrying out the following:

operating the tunable spectral filter for filtering light passing towards the image sensor with the at least one additional spectral filtering curve, and operating the sensor for a predetermined integration time to obtain a certain image of relatively high light intensity on the sensor; and operating the tunable spectral filter for filtering light passing towards the image sensor by the at least three spectral filtering curves corresponding to the at least three colors, to obtain from the sensor at least three images corresponding to the at least three colors; As noise content in the certain image of the relatively high intensity is lower than a noise content of the at least three images, the system is therefore further configured and operable for carrying out de-noising processing to reduce the noise content of the at least three images based on the certain image having a lower noise content. The de-noising processing may be a multi-frame de-noising, such as bi-lateral filtering.

According to some embodiments of the present invention at least one reflective surfaces of the etalon is mounted on actuators providing for controlling the optical distance between the reflective surfaces. The one or more actuators may include piezoelectric actuators and/or MEMS actuator, such as electrostatic MEMS actuator. Alternatively or additionally the etalon may include electro-optical media placed in the space between the reflective surfaces. The electro optical media is configured and operable for providing control over the optical distance between the reflective surfaces. According to some embodiments of the present invention the coating layer of high reflective index is configured/has refractive index n>3 (e.g. using Poly-Silicon, GaAs and/or other coating material). This provides for improving a match between the spectral transmission curves provided by the etalon and conventional RGB colors.

According to some embodiments of the present invention the reflective surfaces include anti-reflective coating specifically selected to optimize a matching between the spectral filtering curves of the etalon and the spectral curves of conventional RGB colors while improving the transmission of wavelengths of the spectral curves through the etalon.

According to some embodiments of the present invention the system includes a telecentric optical module located in the optical path of light propagating towards the tunable spectral filter. The telecentric optical module/lens is configured and operable for reducing at least one of the following: (i) spatial variation in of chief ray angles of light beams that incident on the tunable spectral filter; and (2) an angular subtense of the light beams; thereby improving spatial uniformity of the spectral filtration operation of the tunable spectral filter.

According to yet another broad aspect of the present invention there is provided an imaging system for acquisition of color images. The system includes: an image sensor; a tunable spectral filter arranged in an optical path of light propagation towards the image sensor; and a control system connected to the image sensor and to the tunable spectral filter. The control system is adapted for generating a colored image by: (i) sequentially operating the tunable spectral filter for sequentially filtering light passing towards the image sensor, with three or more different spectral filtering curves during three or more corresponding integration time durations; (ii) grabbing three or more images corresponding to the three or more different spectral filtering curves from the image sensor; and (iii) processing the images to produce the colored image. According to this embodiments of the invention the three or more spectral filtering curves include at least three spectral filtering curves corresponding to at least three specific colors in the visual spectral regime, and at least one additional spectral filtering curve selected for transmitting relatively high light intensity through the tunable spectral filter as compared to a light intensity transmitted through the filter when tuned to the at least three spectral filtering curves. The additional spectral filtering curve provides at least one image of the three or more images with improved dynamic range and reduced noise content. Accordingly the control system is adapted for utilizing the at least one image for implementing multi frame processing (e.g. Bilateral filtering process) with the three or more images, for at least one of the following: (i) reducing noise content from the colored image; and (ii) improving a dynamic range of the colored image.

In some embodiments of the present invention, the at least one additional spectral filtering curve include at least one of the following: (i) a white spectral curve used for obtaining high intensity images within the visible spectrum; and (ii) a NIR spectral curve used for obtaining high intensity images in certain imaging conditions. Also in some embodiments the at least three specific colors includes the three RGB colors.

According to yet another broad aspect of the present invention there is provided method for color image acquisition. The method includes sequentially operating a tunable spectral filter arranged in an optical path of light propagation towards an image sensor, for sequentially filtering light passing towards the image sensor with three or more different spectral filtering curves corresponding to three or more colors. The sequential filtering is performed for over three or more respective integration time durations. According to this embodiment of the invention the method further includes utilizing a tunable spectral filter that is configured as an etalon having a pair of reflective surfaces, and wherein at least one of the reflective surfaces comprises at least one of the following: (i) a layer of high reflective index of at least n=2.3, and (ii) a layer of refractive index smaller than 1; thereby providing wide transmission peaks of the spectral curves with FWHM in the range of about 50 to 80 nm.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIGS. 1A to 1C are illustrations of conventional color imaging systems wherein FIGS. 1A and 1B show an imaging system utilizing Color Filter Array and a corresponding image acquisition pipeline. FIG. 1C illustrates schematically a color imager utilizing the color separation by spectral beam splitting;

DETAILED DESCRIPTION OF EMBODIMENTS

Figure 2A:
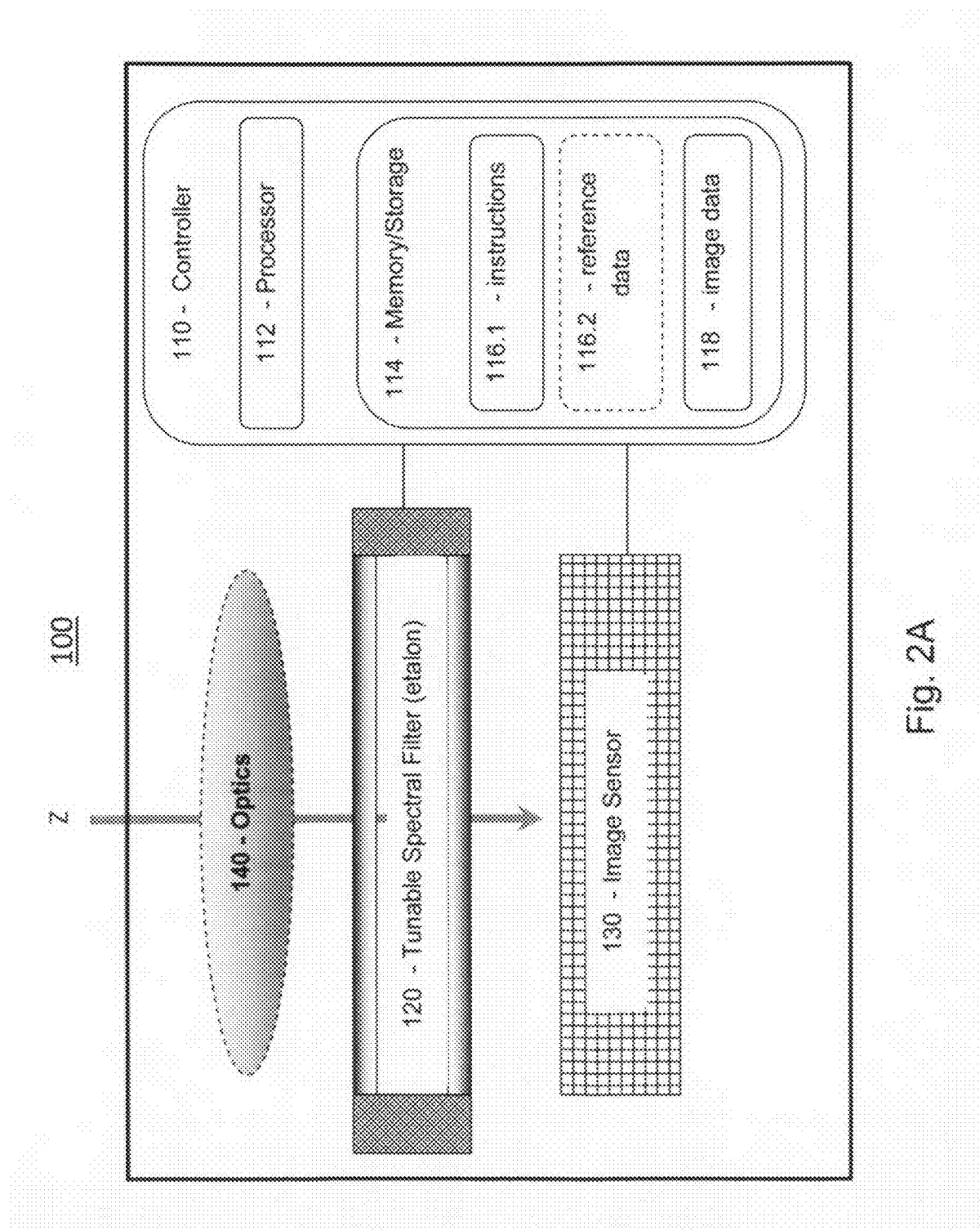
FIGS. 2A and 2B are block diagrams illustrating schematically a system and a method of color image acquisition according to an embodiment of the present invention.

Reference is made to FIG. 2A illustrating schematically a system 100 for color imaging configured according to an embodiment of the present invention. The system 100 includes a sensor 130 and a tunable spectral filter 120 placed in the general optical path of light propagation towards the sensor (e.g. intersecting the Z axis in the figure), and a control system (controller) electrically connected to the image sensor and to the tunable spectral filter and configured and operable for capturing a colored image by sequential acquisition of monochromatic frames corresponding to different colors (different spectral profiles) from the sensor. In FIG. 2A also illustrated schematically is an optical system 140 (e.g. lens(es)) arranged in the optical path of the sensor. It should be noted that the optical system 140 is optional and does not form an integral part of the system 100 of the present invention.

According to the present invention the controller 110 is adapted for creating/capturing a colored image by sequentially operating said tunable spectral filter 120 for sequentially filtering light incident thereon with three or more different spectral filtering curves/profiles and operating the sensor 130 for acquiring three or more images (monochromatic images/frames) of the light filtered by the three or more spectral curves respectively. The tunable spectral filter 120 is operated to maintain each of the spectral filtering curves for corresponding time slot durations, during which the sensor 130 is operated for capturing the respective monochrome images with respective integration times fitting in these time slots. Accordingly each of the captured monochrome images corresponds to light filtered by a different respective spectral filtering curve and captured by the sensor 130 over a predetermined integration time.

The controller is configured for receiving and processing readout data indicative of the three or more monochrome images from the sensor and generating data indicative of a colored image (namely an image including information on the intensities of at least three colors in each pixel of the image).

The system 100 of the present invention utilizes an image sensor 130 sensitive in the entire wavelength band of light to be detected (e.g. visual range or NIR-visual range) allowing the sensor to sequentially sample several colors in the desired wavelength band. Each color is typically sampled in a fraction of the standard/conventional integration time for capturing a colored image. For example, if the normal/typical integration time ranges between 1 millisecond to 30 seconds, in the technique of the present invention, each color is captured within only a fraction of that integration time.

Accordingly, the tunable spectral filter 120 is configured to provide sufficiently fast tunability (namely transition time between colors/spectral-filtering-curves) in the order of a few milliseconds or less, and preferably not exceeding one millisecond. This is achieved according to some embodiments of the present invention by utilizing a specific configuration of an etalon based spectral filter while mechanically coupling one or both mirrors of the etalon with materials, which are configured to function as piezoelectric actuators providing agile and accurate control over the spacing between the mirrors. In this regards, it should be understood that in various embodiments of the present invention other types of mechanisms enabling accurate and fast control over the optical distance/separation between the mirrors may also be used. These may be mechanical mechanisms controlling the geometrical distance between the mirrors (such as MEMS actuators), and/or optical or electro-optical mechanisms which can provide control over the optical length between the mirrors of the etalon (with/or without changing the actual relative geometrical displacement between the mirrors). For example, the etalon may be configured to enable control over the optical path length between the mirrors by any of the following techniques: (i) Mounting one or both of the etalon mirrors on actuators such as mechanical or capacitive or electrostatic or electromagnetic Micro-Electro-Mechanical (MEMs) based actuators, or by applying different external conditions, such as voltage, on susceptible materials such as piezoelectric crystals; (ii) Alternatively or additionally, in some embodiments of the present invention the spacing between the etalon mirrors is accommodated with optical media which refraction index can be controlled (e.g. electrically controlled) by applying different external conditions such as voltage thereto. For example, electro-optical crystals and/or liquid crystal materials can be used to control and adjust the optical length between the mirrors of the etalon. It should be understood that a control over the optical distance between the etalon mirrors and hence over the spectral filtration function of the etalon may be achieved according to the present invention by any combination of the techniques (i) and (ii).

To this end, the controller may be connectable to the etalon (e.g. to the mechanical/Piezoelectric actuators of the etalon and/or the electro-optical media between the etalon mirrors) for controlling the spectral filtration transmission/filtration profile of the etalon. The controller may also be connected and to the sensor, and is configured to sequentially tune the etalon to each of the desired colors and to sequentially grab/readout and store image data corresponding to these colors. The controller is generally associated with a memory 114 (data storage) and processor 112. The processor is operative to execute a set of instructions 116.1 (e.g. hard/soft coded instructions) for coordinating the operations of the etalon and sensor and for storing in the memory 114 the image data 118 (e.g. readout from the sensor).

It should be noted that in some embodiments of the present invention the optical system 140 is configured to direct light to propagate through the tunable spectral filter with relatively similar Chief Ray Angles (CRA) across the filter plane (namely with low variability of the CRAs), and with low variability of the marginal-to-marginal angle range of different light beams across the filter plane. In this regards it should be understood that the term chief ray angle, corresponds to the nominal angle by which a light beam intersects an optical plane, such as the image optical plane, being the sensor's plane, and/or the optical plane at which the tunable spectral filter 120 resides. The phrase marginal-to-marginal angle range relates to the angular span of the light beam about its respective chief ray angle.

Alternatively, in case the CRA>10 degrees, color/spectral correction algorithms may be applied and replace supportive optical designs. Also, optical design and such algorithms may be combined to improve the color/spectral correction results.

Thus the optical system, which is characterized by low CRA variability and low variability of the angular difference of every two marginal rays range of light beams passing through the filter, is designed and configured to direct all/most of the light rays to incident on the tunable spectral filter with substantially similar angles if incidences $\alpha$ and with small differences $\Delta\alpha$ between the angles of incidence of different rays. Accordingly, when utilizing such an optical system 140, the filter provides a similar filtration effect to the light rays passing therethrough within the similar angles (i.e. similar profile of spectral filtration is obtained for light beams passing at various locations through the filter (through the center and the margins thereof).

It should be noted that in certain configurations of the system 100, the tunable spectral filter 120 is placed in front and adjacent to the plane of the sensor 130. Accordingly the optical system 140 is configured for reducing the variance in the angles of the light beams crossing the tunable spectral filter and impinging across the sensor surface. This is achieved by reducing the variance in the chief ray angles of the light beams impinging on different pixels of the sensor and also possibly reducing the variance in the marginal to marginal angle range of each light beam. Typically (e.g. in conventional optical designs), due to symmetry considerations, the chief ray angles of light beams impinging the center of the sensor is 0°, where in conventional optical designs chief ray angles of light beams impinging near the edges of the sensor may be relatively large (e.g. about 32° or more). However, according to the present invention, since an etalon based tunable spectral filter 120 is used and the spectral filtering profile of the filter 120 depends on the angle of the light beam (and inter-alia on the chief ray angle thereof). Therefore, it is desired to reduce the variance of the chief ray angles of the light beams which are imaged on the sensor 130, so as to improve the spatial uniformity of the color filtration profile across different pixels/locations on the sensor. To achieve that, in certain embodiments of the present invention the optical system 140 includes with telecentric optics (e.g. telecentric lens module) that is adapted for reducing the variance of the chief ray angles of the light beams directed to the sensor while keeping the upper-lower angular difference within a certain range. The telecentric optics is configured to reduce the chief ray angles at the edge of the sensor to below 32°, so as to improve the spatial uniformity of the color filtration by the tunable spectral filter 120. Also the telecentric optical system 140 may be configured to reduce the difference between 2 marginal rays (which is the angle span of the light rays in the light beams impinging respective pixels in the sensor 130). As a result the ray cones approaching the tunable spectral filter surface have substantially the same angle of incidence and angular subtense everywhere one the plane spectral filter. For example in certain embodiments the optical system is desired such that the variance in the marginal to marginal angle range for light beams impinging different pixels in the sensor is preferably less than 8°, so as to improve the uniformity of the spectral filtrations of different light rays impinging the sensor.

It should be understood, a person of ordinary skill in the art of optical design will readily appreciate how to design and configure an optical system, based on the above description so as to reduce the variation of chief ray angles and/or reduce the variations in the difference between 2 marginal rays impinging the sensor, and thereby improve the uniformity of the spectral filtration across the sensor.

Figure 2B:
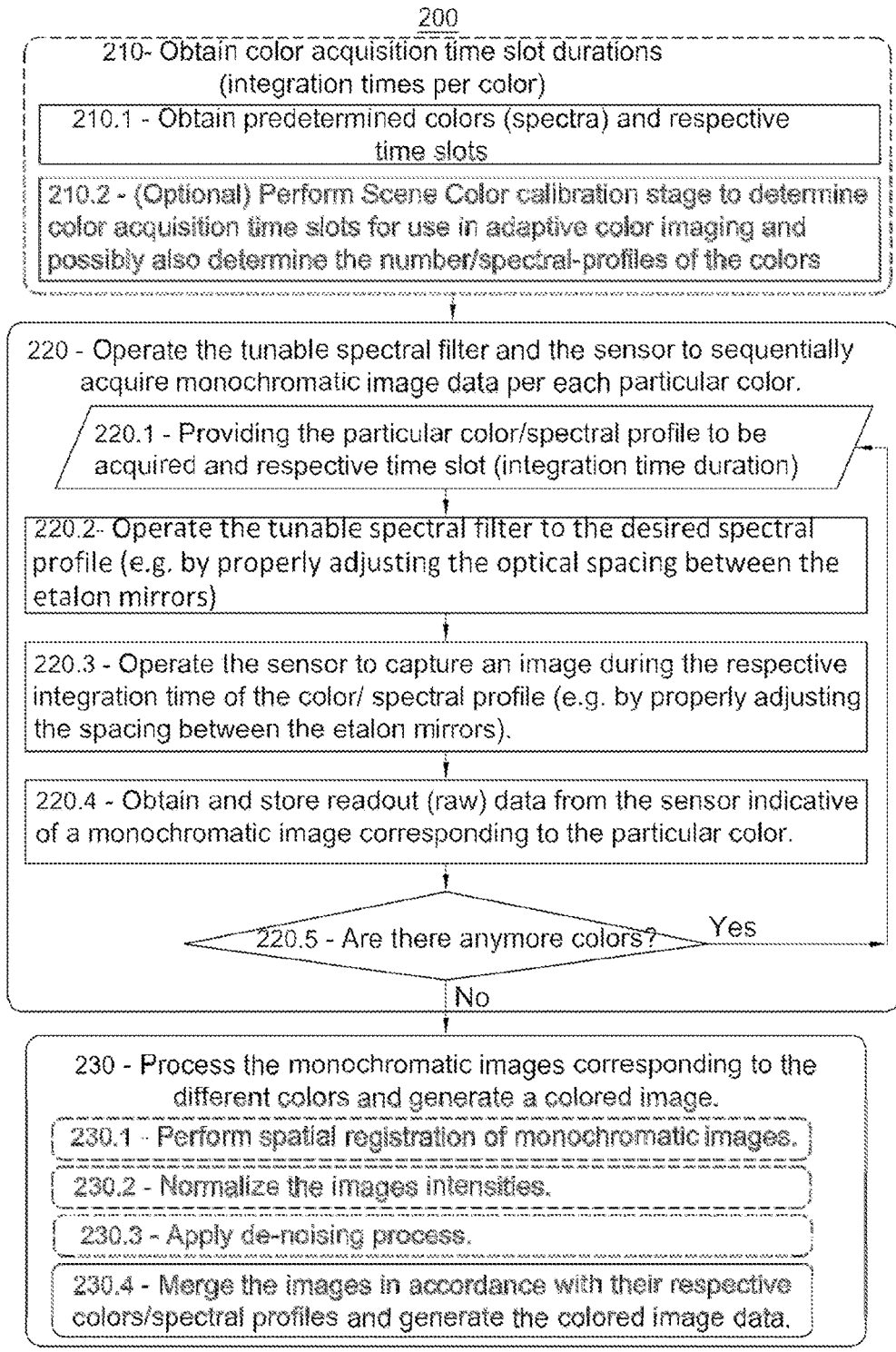

FIG. 2B is a flow chart illustrating in more detail method 200 performed according to some embodiments of the present invention for capturing and creating colored images by sequential capturing of monochrome images corresponding to different spectral profiles/colors. Method 200 is carried out by the controller 110 for operating the system 100 for capturing the plurality of monochrome images and generating the colored image therefrom.

In optional operation 210, the controller allocates predetermined integration times (time slots) for capturing each color by the sensor. In this regard, it should be noted that in some embodiments the predetermined integration times are predefined in advance (e.g. hardcoded) per color (operation 210.1). However, in some embodiments of the present invention an adaptive color acquisition method is applied according to which the integration time per color is adaptively/dynamically allocated, for example in-situ, based on the imaged scene (operation 210.2). In the latter case (210.2), the controller may be adapted to perform a preliminary calibration step for determining an optimal integration time for each color and possibly also determine the number and/or the central wavelengths of the colors to be grabbed. The method of adaptive color acquisition is described in more detail with reference to FIG. 2C.

In operation 220 the controller operates the tunable spectral filter and the sensor to sequentially acquire monochromatic image data per each desired color. The desired colors and the integration times for capturing images of each color are obtained in step 210 above. To this end, operations 220.1 to 220.4 are performed for each of the desired colors (spectral profiles). In 220.1 data indicative of a particular color/spectral profile to be acquired and respective integration time are obtained. In this regard the spectral profile may be represented in various ways, for example by any suitable color code and/or simply by data indicative of the optical distance between the etalon mirrors or amplitude of the electric signal to be provided to the mechanical/piezoelectric actuators and/or electro-optical media of the etalon for achieving this optical distance. In 220.2 the controller operates the tunable spectral filter to the desired color/spectral profile (e.g. by properly adjusting the spacing between the etalon mirrors). In 220.3, the controller maintains the spectral profile for sufficient time slot duration and operates the sensor to capture a monochrome image of the color image during respective integration time of the color. Finally, in 220.4 the controller obtains and stores readout (raw) data indicative of the monochromatic image from the sensor. As indicated in 220.5, the operations 220.1 to 220.4 are repeated for each of the colors until monochrome images of all the desired colors are grabbed.

Operation 230 is typically performed after grabbing and storing raw data of at least some of the monochromatic images corresponding to several colors. The controller processes the raw data, by utilizing one or more image fusion processes for merging the images to generate one colored image.

It should be noted that in some embodiments, the monochrome images of the different colors are inspected prior to their merging to a single colored image, in order to verify/check their properties/quality. In case monochrome image of insufficient quality is identified, another monochrome image of the same or similar color/spectral profile may be recaptured (e.g. by properly operating the tunable spectral filter and the sensor). For example, in some cases the brightness/light-intensity captured in the monochrome images is estimated/determined and images associated upon determining/identifying a monochrome image which brightness is to low (e.g. below a certain threshold), capturing additional image(s) of the same/similar color/spectra, possibly using longer integration time, so as to obtain a better quality image/information on that color. Then, at least one of the original image and/or the additional image(s) which were captured with the same/similar color profiles may be used/merged with other monochrome images to produce the colored image.

The image fusing algorithms may optionally include image registration processing (operation 230.1) adapted to compensate over shifts between monochromatic images of different colors (such shifts may occur because the images of different colors are generally captured at slightly different times during which slight camera movements may occur). The registration algorithm may provide for reducing smearing (that appears in all single shot acquisitions).

In this connection it should be noted that conventional imaging techniques, such as those relying on the Bayer CFA and Bayer's de-mosaicing schemes compensate for image smearing by applying stabilizing mechanisms to take into account the camera movements. However, image smearing due to movements of objects in the scenery cannot be handled by such schemes, thus still creating smeared images. To this end, advantageously the present invention provides for compensating for both such movements of the camera and of the scenery. This is achieved by utilizing the registration processing for registration between the monochrome images. As each of the monochrome images is captured in only a fraction of the total exposure time, the effect of movement smearing in these images (due to both camera and scenery motion) is substantially reduced. Thus, the registration processing of 230.1 (performed for example by conventional image registration techniques) to compensate over the relative dispositions between the temporally acquired monochrome images which are used to compose the colored image, provides substantial reduction of the image smearing (each monochrome frame is taken in shorter time than the total typical color image exposure time).

Also, the image fusing algorithms may optionally include color calibration processing (operation 230.2) for calibrating/normalizing the intensities in the grabbed monochromatic images. This is achieved by processing the raw data of the monochrome images of the different colors to normalize their intensities, for example by taking into account the integration times allocated to each color, the transmission/loss of the spectral filter when tuned to different colors (possibly also the spectral profile/filtering-curve of transmission of the etalon) and the sensitivity of the sensor for each color. To this end for each color a particular intensity normalization factor may be determined and multiplied by the respective monochrome image.

In some embodiments of the present invention optional operation 230.3 is carried out to reduce noise (such as shot noise) from the images. In some cases inter-frame noise reduction techniques are executed in one or more of the monochrome frames that are used for constructing the colored image as to reduce the noise in the frame. Inter-frame noise reduction techniques, such as non-local means noise reduction, are performed. Such techniques utilize on the information of the image frame itself for reducing the noise from the frame.

Alternatively or additionally, in some embodiments of the present invention the fact that multiple monochrome frames of different spectral profiles are grabbed for each colored image to be produced, is advantageously exploited for the purpose of noise reduction/filtration. To this end, in 230.3 multi-frame noise reduction process may be applied to the monochromatic frames (e.g. to at least two of them) from which the colored image is to be constructed. For example multi-frame de-noising process based on the Bilateral filtering de-noising technique may is executed in certain embodiments of the present invention for reducing shot noise from the plurality of monochrome frames.

In this connection, it should be noted that in certain embodiments of the present invention the plurality of monochrome frames, which are used for constructing a colored image, may include at least one monochrome frame which was grabbed with relatively long integration time and which therefore has relatively low noise content, and one or more monochrome frames, which were grabbed with relatively short integration time, and therefore have relatively high noise contents. For example, in some embodiments of the present invention, four monochrome frames are grabbed: one with the spectral filter tuned to white (i.e. tuned to provides substantially flat transmission—e.g. more than 60% transmission over at least 90% visible spectral range), is grabbed with long integration time (thus having low noise content); and three R, G, & B frames are grabbed with relatively shorter integration time, thus with relatively higher noise contents (possibly also NIR frame is grabbed, that may replace the white frame). Then, in 230.3, a de-noising process based on the Bilateral filtering technique (other multi-frame de-noising techniques may be also applicable) is executed to reduce the noise in the R, G, & B frames and possibly also in the NIR frame by exploiting the low noise content of the white frame which was grabbed with longer integration time.

Thus generally, according to certain embodiments of the present invention, the monochrome frames that are used for constructing the colored image include at least one frame, which is associated with improved exposure to the scene illumination as compared to other of the monochrome frames (a frame that is exposed to the scene for longer integration time duration and/or exposed to higher light intensity from the scene—for example when less light is filtered—as in white frames). According to the invention, in such embodiments Bilateral filtering process may be executed to utilize the information in the frame with the improved exposure to the scenes illumination to apply de-noising to the frames which were less exposed to the scene's illumination, and by that reduce the noise content from the final color image produced by those monochrome frames. A person of ordinary skill in the art of noise filtering and signal processing will readily appreciate how to apply multi-frame de-noising techniques, such as bilateral de-noising, to reduce the noise from a plurality of frames corresponding to a similar scene.

Figure 3A:
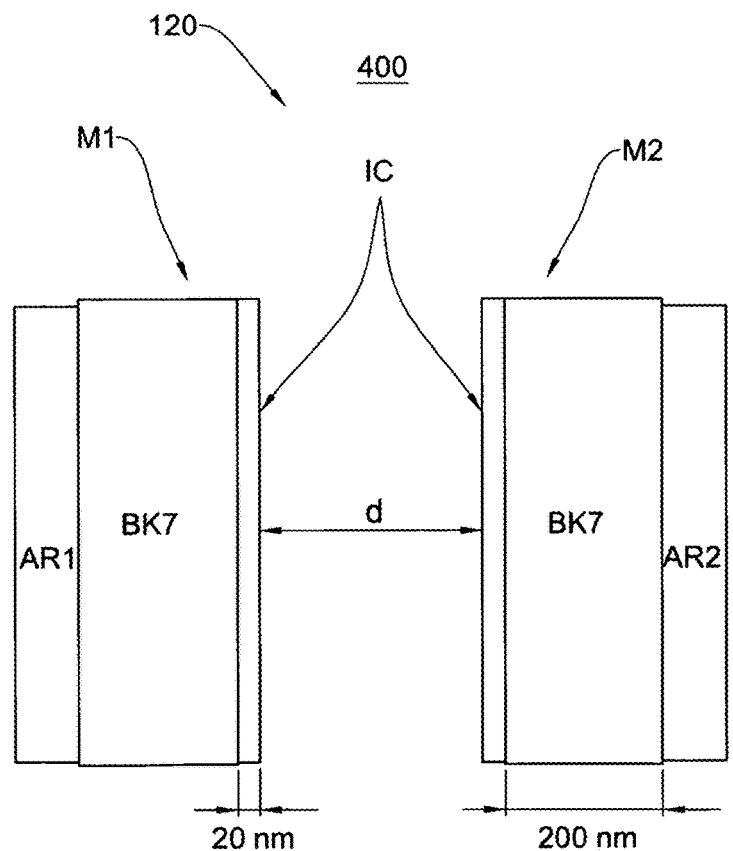
FIG. 3A illustrates an embodiment of a tunable spectral filter of an etalon type which is configured according to the present invention for acquiring images in the visual and possibly NIR spectral bands by sequential color acquisition.

In 230.4 image fusion algorithms are performed to merge the monochromatic images (possibly after being properly normalized and registered) in accordance with their respective colors/spectral profiles, and generate the colored image data. In this regard, in some cases this final step of merging is straightforward. Particularly, in some embodiments of the present invention, as illustrated in FIG. 3A and described in more detail below, the etalon is advantageously and uniquely configured to be tunable to colors/spectral profiles matching the standard colors/spectral-profiles of the conventional color filter arrays such as Bayer's CFA. In such cases generating a color image/bit-map may be achieved by constructing the RGB data of each pixel in the bit-map from the monochrome images.

However, generally, in some cases, merging may not be so straightforward and may optionally require color correction and/or interpolation. Color correction processing applied by the technique of the present invention may generally include two types of color correction processes:

(1) Inter-frame color correction may be performed for re-calibrating color intensities, where:

$$R_{calibrated} = a_1 * R + a_2 * G + a_3 * B$$

$$G_{calibrated} = b_1 * R + b_2 * G + b_3 * B$$

$$B_{calibrated} = c_1 * R + c_2 * G + c_3 * B$$

(2) per pixel color correction (e.g. intra-frame color correction), where intensity calibration is performed per pixel, at a given frame, to compensated for spatial variations in the transmission of the spectral filter.

These two techniques of color corrections may be applied per pixel (each pixel color may be transformed slightly differently). To this end the inter-frame color correction is used for converting between the specific colors/spectral profiles/wavelength of the monochromatic images (namely the spectral profiles of transmission to which the etalon was tuned when grabbing the monochromatic images) and the color palette of the colored image to be generated. For example, four monochromatic images may be grabbed with the etalon respectively tuned to Cyan, Magenta and Yellow (CMY), while the pallet of the colored image to be generated may be the RGB pallet. To this end, in some embodiments of the present invention, color interpolation/processing may be used to determine the intensities of the color image pixels (e.g. RGB pixels) by interpolating the corresponding pixels of the monochrome images based on the respective spectral profiles of the etalon by which those images were captured.

In this regard, in some embodiments of the present invention, the system may be configured for grabbing more than three colors, for example grabbing monochromatic images corresponding to NIR, R, G, B and the colored image is to be represented by RGB or CMYK. In some cases the monochrome images may correspond to various arbitrary is (e.g. predetermined) colors/spectral profiles—relating for example to non-standard pallets. To this end, color interpolation may be used to convert from a plurality of monochrome images of selected spectral profiles of the etalon, to a colored image of a standard color palette.

Specifically, in embodiments where monochrome image (s) in the NIR spectrum are also grabbed in addition to monochrome images in the visual spectrum, the NIR images may be used to enhance the final colored image produced specifically in dark/night scenes. For example, color interpolation processing may utilize information from the NIR to emphasize objects appearing in the visual spectrum to thereby create more vital images of dark/low light sceneries.

In some embodiments of the present invention the system may be configured for grabbing "monochromatic" images corresponding to three or more color profiles/combinations, from which color image information corresponding to the three RGB colors and possibly also NIR image data may be determined. To this end it should be understood that the terms/phrases monochromatic and monochromatic/gray-scale image should be understood in its broad sense as relating to image data corresponding to certain specific spectral filtration profile, and wherein three or more such monochrome images are grabbed and used according to the present invention to obtain colored image information. In this regards it should be noted that the three or more spectral filtration profiles of the three or more respective monochromatic images may include spectral profiles corresponding to any three or more different combinations of the {Red (R), Green (G), Blue (B), White (W), and Near-Infra-Red (NIR)} colors. Some non limiting examples of possible filtering curve combinations that can be used for grabbing the three or more monochrome frames, by which the color image can be constructed, include:

i. {Red, Green, Blue} frames and an optional NIR frame.
  ii. {White+Red, White+Green, White+Blue} frames plus an optional NIR frame.
  iii. {White−Red, White−Green, White−Blue} frames plus an optional NIR frame;
  iv. {NIR+Red, NIR+Green, NIR+Blue} frames plus an optional NIR frame.

The etalon/tunable spectral filter may be configured according to the invention so as to be tunable to the desired combination of spectral filtering curves (e.g. any of the combinations i. to iv. or other combination of spectral filtering curves such as CMY, RGB & White, and others). To this end, the configuration of the etalon to the desired combination of filtering curves may be achieved by proper selection of (i) the optical spacing between the mirrors of the etalon; and/or (ii) the refractive index parameter of the media between the mirrors; and/or (iii) the inner coating material of the etalon's mirrors.

It should be understood that tuning the tunable spectral filter to a White (W) spectral filtration profile (namely to a state in which it does not substantially filter any of the visible colors) can be achieved by setting the optical distance between the etalon mirrors to be much shorter than any visible wavelengths. For example the etalon may be adjusted such that the optical distance between its mirrors does not exceed about 100 nm or even below (e.g. does not exceed 60 nm). This provides that light rays in the visible wavelength regime (e.g. about 400 to 700 nm) do not substantially interfere within the etalon and thus a white spectral filtration profile is obtained.

Thus, both color corrections may be applied in 230.4. This inter frame color correction (color interpolation) is required in cases where the tunable spectral filter/etalon provides non-standard spectral transmission profiles (namely which do not correspond to standard color pallet used/required for the colored image that is to be produced). Intra-frame color correction is required, when the spectral filtering isn't uniform across the filter due to variations in CRA and marginal rays).

To this end, spectral uniformity across the sensor, is obtained either by corrective optical design (e.g. utilizing telecentric optics), followed by "weak" spectral correction algorithms, or by "hard" spectral correction algorithms. As indicated above, this use of corrective lens which has telecentric properties limits variation of the CRA (chief ray angle) as well as the angular difference between each two marginal rays, across the sensor. Remaining non-uniformities, or if corrective optics is not used, all spatial non uniformities in the spectral filtration, may be corrected by color correction algorithms. Such algorithms, termed above, intra-frame color correction, may be performed, per each color, based on data indicative of the spatial non-uniformity of the spectral transmission through the etalon, for light of that color arriving to each pixel on the sensor.

For example considering the case where the tunable spectral filter is tunable to the pallet such as ii above, e.g. wherein the pixel intensities of the monochrome frames are as follows:

$1^{st}$ monochrome frame corresponds to: 50% White+50% Red;

$2^{nd}$ monochrome frame corresponds to: 50% White+50% Green;

$3^{rd}$ monochrome frame corresponds to: 50% White+50% Blue.

The RGB frames may be estimated based on a weighted sum of these three frames. As indicated above, in some cases inter-frame color correction is also performed to compensate over defects/production tolerances of the tunable spectral filter. Inter-frame color correction is performed according to the invention when an interference spectral filter such as Etalon is used. In such cases the spectral transmission profile of each color may is not spatially uniform across the etalon due to two reasons: (1) different CRA angles and angular difference of marginal rays; (2) Production/manufacturing tolerances. Manufacturing variations are caused by the etalon mirrors being not parallel with respect to one another, and/or when one, or both, of the mirrors is not exactly planar). Accordingly non-uniform color may be captured by the image sensor when grabbing the monochrome frames.

Therefore according to the present invention both inter-frame and intra-frame color corrections may be applied to correct the colors due to inherent structure and inaccuracies in the etalon. The inter-frame color correction may be applied optically by utilizing specific optical design, and/or by applying a color correction/gauge matrix per pixel of the image to calibrate the colors of the pixels. Also other image processing approaches may be applied. For example by comparing the color content in similar patches and zones within different locations the image, and adjusting the colors in one zone using the colors in another zone (e.g. serving as a reference zone).

As also indicated above, in embodiments of the present invention additional non RGB frames such as NIR frames/ white frames, are grabbed and are used to enhance the properties of the colored image. Such additional frames, which may be associated with any non-standard RGB color spectrum, may be used according to the invention to improve the properties of the final colored image, for example improving the dynamic range by using NIR frames for improved low light/night photography, reducing noises by utilizing white frames captured with high exposure; and/or providing better color fidelity by using multiple exposure of non-RGB frames to allow color correction optimization over additional colors and/or improving the resolution for example by utilizing super resolution techniques to obtain and sharper images (e.g. digital super resolution utilizing sub-pixel techniques).

Figure 2C:
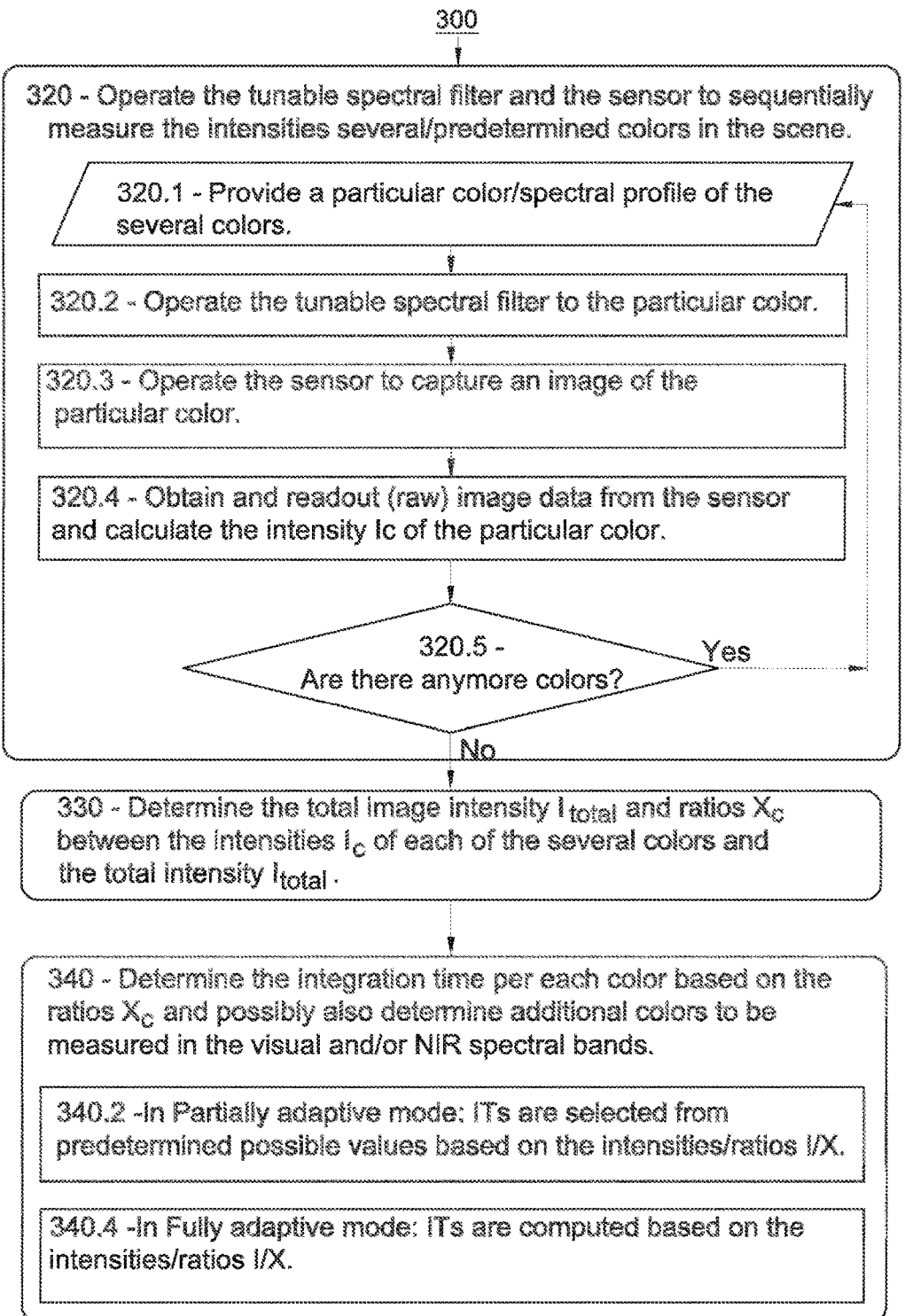
FIG. 2C illustrates more specifically a method for adaptive color acquisition according to an embodiment of the present invention.

Reference is made to FIG. 2C showing a flow chart of a method 300 used for adaptive color imaging according to some embodiments of the present invention (e.g. in step 210 of method 200 above). As noted above, in the temporal color sampling technique of the present invention each color is sampled in a fraction of the total image acquisition time period. The division of the total image acquisition time into a specific integration time for each color (monochrome image) may be set by two alternatives: (I) a pre-determined scheme (e.g., ⅓ of the total acquisition time period per color), and (II) an adaptive/dynamic scheme, which depend on the imaged scene. Computer simulations show that in 7 of 21 color images, non-symmetrical division scheme outperformed the symmetrical scheme in terms of the mean square error (MSE) of color intensity values.

The present invention provides a novel method/algorithm for determining the ratio of integration time periods for each of the monochrome images based on the scene and the lighting to provide optimal integration time periods. In some embodiments of the present invention the method 300 is executed in a preliminary color calibration stage (which may take place for example simultaneously during the camera auto-focuses and/or during other procedures prior to the actual exposure time). Accordingly as the image of the scene may not be focused at this stage on the sensor, the color intensities $I_c$ may be calculated for example from the average intensities of the respective image pixels.

To this end, in some embodiments of the present invention method 300 is used in step 210 above to determine an optimized integration time for each color (possibly also determine additional color components that should be measured and thereby providing for carrying out adaptive color imaging of the scene. The method 300 includes operation 320 in which the controller 110 operates the tunable spectral filter and the sensor to sequentially measure the intensities $I_c$ of several/predetermined colors in the scene (where c is used herein to denote color index). In this regard in operation

320.1 a particular color/spectral-profile c of several colors, whose intensities should be measured, is provided. In 320.2 the controller 110 tunes the tunable spectral filter 120 to that particular color c and in 320.3 the sensor 130 captures the image of that color. In 320.4 the controller grabs readout/image data of that color c from the sensor 130 and then processes this image data to determine the intensity $I_c$ of the color c. As indicated in 320.5, the operations 320.1-320.4 are repeated for each one of several/predetermined colors {c} whose intensities are to be measured. For example in some cases colors/spectral ranges corresponding to the Red Green and Blue are measured (namely: c∈{R, G, B}) (for example measuring the color intensities, $I_{red}$, $I_{green}$ and $I_{blue}$).

In 330 the controller 110 determines/computes the total intensity $I_{total}$; e.g. as $I_{total} = \Sigma\ I_c$ (e.g. $I_{total} = I_{red} + I_{green} + I_{blue}$, and/or the ratios $X_c$ between the intensities $I_c$ of the different colors (indexed c) and the total intensity $I_{total}$. For example, the ratios $X_{red} = I_{red}/I_{total}$, $X_{green} = I_{green}/I_{total}$, and $X_{blue} = I_{blue}/I_{total}$ are determined/computed.

In 340 the controller 110 determines/computes the integration times per color (e.g. per color c) based on the ratios $X_c$ and/or based on the intensities $I_c$. In some embodiments the controller 110 utilizes predetermined thresholds (e.g. a set of predetermined intensity thresholds $TH_c$ per color (e.g. $\{TH_{red}, TH_{green}, TH_{blue}\}$ and processes the ratios Xc, and/or the intensities Ic based on those thresholds to determine the optimal sensor integration time to be used for each color (e.g. by comparing the color intensity ratios $\{X_{red}, X_{green}, X_{blue}\}$ with pre-determined respective thresholds $\{TH_{red}, TH_{green}, TH_{blue}\}$.

In some embodiments a computerized state machine is used to determine the proper integration times per color. Specifically, the state machine may be configured and operable in any one of the following modes: (i) Full adaptivity mode (340.4 in the figure) and (ii) Partially adaptive mode (e.g. pre-configured mode) (340.2 in the figure). In some cases the state machine is configured for providing full color adaptivity by computing the integration time for each color c based on the color intensity $I_c$ and/or ratio $X_c$ (in general for higher intensities/ratios, shorter integration times are provided). In other cases, the state machine may be used to select the integration time from pre-defined sets/lookup table of possible integration times (e.g. based on predetermined threshold data which may for example may include threshold conditions (e.g. per color) associating the determined intensities/ratios $I_c/X_c$ with required integration times.

Moreover, in some cases the controller may be configured and operable to determine, based on the measured intensities/ratios $I_{total}/I_c/X_c$ that additional colors (monochromatic frames/images) should be captured and used to compose the colored image. For example, upon identifying that the total intensity $I_{total}$ is too low (e.g. below a predetermined threshold) the controller 110 may determine that an additional frame in the NIR should also be captured to enhance low light imagery. Also upon identifying certain light conditions (e.g. if one or more color intensities $I_c$ are small than a pre-determined threshold—other implementations might exist) additional frames in the controller 110 may determine that additional monochrome frames of various colors in the visual band (e.g. R, G, B frames) should be captured and used to compose the colored image.

Thus, the suggested image acquisition pipeline described with reference to methods 200 and 300 of the present invention, offers several advantages for color imaging, such as full resolution, true color component measurements and flexibility in the time per color integration time. Moreover, these methods allow several frames per color and sharper image per frame due to shorter integration time. Also there are several major advantages compared to the conventional Bayer-Demosaicing (BD) pipeline.

Figure 2D:
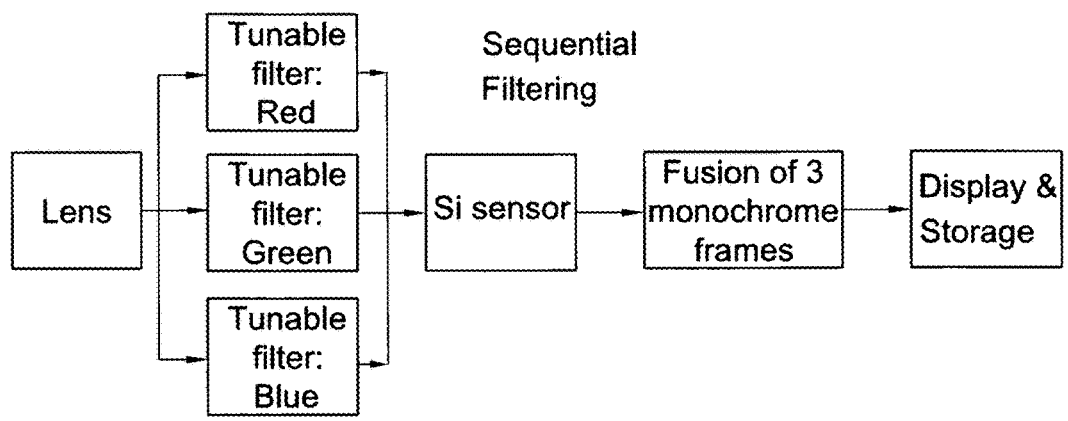
FIG. 2D shows in a self explanatory manner an image acquisition method (pipeline) according to an embodiment of the invention for acquiring a plurality of monochrome RGB images and generating therefrom a colored image.

FIG. 2D is a schematic illustration showing in self explanatory manner the acquisition pipeline according to some embodiments of method 200 of the present invention in which the etalon is specifically configured (as described below with reference to FIG. 3A) for providing spectral transmission curves fitting the conventional RGB spectral curves. Here instead of the conventional Bayer's filter and de-mosaicing (shown in FIGS. 1A and 1B), the etalon is sequentially tuned for capturing three monochrome Red Green and Blue images which are captured by the sensor and merged together to form the color image. To this end, for the same exposure time, the technique of the present invention provides sharper and higher quality images in terms of the MSE of the color intensities in the final colored image. Specifically a sharper image may be obtained because the resolutions of the monochrome images match the actual true resolution of the sensor (namely because images are captured without the CFA and de-mosaicing of the CFA is thus obviated), and also as a result of the short integration time pre color and spatial registration between the monochrome images. The monochrome images may generally be obtained with exposure times in the order of about It depends on other elements, external to this invention, such as shutters, actuators stabilization time etc. Our invention doesn't limit (minimum or maximum) the exposure time, which is generally shorter-than-the conventional integration time (e.g. 10%-50% of conventional integration time). Thus the final image is sharper due to the shorter integration times of the monochrome images (which are thus less affected by scene and camera movements). Therefore, higher quality images are obtained with improved resolution and reduced total MSE). Also as the invention allows to change the ratio of light acquisition in the red, green and blue (which ratio is constant in BD scheme and typically set to 1:2:1 for "red", "green" & "blue" (RGB) respectively), it provides for better image quality in terms of MSE of colors intensities by selecting the most suitable exposure scheme.

As noted above, according to various embodiments of the present invention, color filtering is carried out by a tunable etalon (such as a Fabry-Perot (FP)). FIG. 3A is a schematic illustration of a tunable etalon 400 configured according to an embodiment of present invention to provide spectral transmission curves that best fit those of the color filters used in conventional CFAs. In addition the tunable etalon 400 is sufficiently thin to fit in the optical path of a camera.

The tunable etalon filter 400 of this embodiment is configured as an air-spaced etalon with two reflective surfaces of two mirrors M1 and M2. The mirrors M1 and M2 are spaced apart by a distance (etalon-spacing) d which is smaller than the visual wavelengths (e.g. d<~400 nm) thus achieving a sufficiently wide free spectral range (FSR) of at least FSR>300 nm. The mirrors, or at least one of them, are mounted/coupled to a suitable mechanical actuator (e.g. piezoelectric material, not specifically shown in this figure) such that the spacing between the mirrors M1 and M2 can be adjusted.

In this connection, it should be noted that the spacing between the mirrors is gaseous (e.g. air, and including vacuum for that matter), to provide a refractive indices difference that is large enough between the inner coating material (e.g. poly-silicon, or other high refractive index inner coating) and the media itself (e.g. air). Moreover, since there is no resistance to actuation of the mirrors, it allows the actuators to accurately and rapidly change the mirrors' positions. This provides that for imaging purposes, the etalon 400 can be tuned with sufficient accuracy and speed with transition time between colors (e.g. about 1 millisecond or less).

The internal sides of the mirrors M1 and M2 are coated with a high-index coating (material(s)) IC having a high refractive index n of at least n>2.3 and more preferably coating material(s) IC having a refractive index n>3.0. Alternatively, or additionally, in some cases the internal coating IC used has refractive index smaller than 1; n<1; these materials may include metals and other materials. It should be noted that according to the present invention the use of coating material(s) with high refractive index provides for relatively wide spectral transmission peak of the etalon (e.g. matching the spectral peak widths of the conventional CFA spectra), while the etalon is sufficiently thin (about 1 mm or less) to fit along the optical axis of a camera (even compact cameras), and while also allowing to utilize gaseous/air spacing between the mirrors to enable fast and accurate tenability, as noted above. In this regard it should be noted that since the gaseous/air medium in the spacing has a generally low refractive index, a large refractive index difference is created, which results in wide spectral transmission peak. Accordingly, although in certain embodiments of the present invention coating materials with refractive index n of about 2.3 or above are used, in certain embodiments it is more preferable to use coating materials with higher refractive index, for example with n being equal to about or above 3, and in some cases, using poly-silicon/or GaAs which have high refractive index of higher than 3.0 for the entire visible spectral range. The higher refractive index may be used to improve the fit between the conventional CFA spectra and the spectral profiles of the etalon of the invention.

For example, in the present example the glass mirrors M1 and M2 are used made of BK7 glass and coated with an inner coating material/layer formed with poly-silicon material. The glass thickness is about 200 nm, the internal coating IC thickness is about 20 nm, to reduce/minimize medium absorption loss, and the spacing/distance d between the mirrors varies in the range between 200 nm to 350 nm to provide tunability in the visual spectral regime (e.g. for tuning to the three RGB colors) and/or about 20 nm to 100 nm spacing for NIR. To this end, the thin and fast tunable etalon is provided with full-width-half maximum (FWHM) of it spectral peak being in the order of about 50-80 nm similar to that of conventional CFA spectra.

In this regard, according to the invention, the combination of etalon parameters relating to the use of internal coating IC with refractive index n>3.8 and the smaller-than-visual-wavelength etalon spacing d<400 nm mimics the transmission curves of common CFA transmission spectra and its wide peaks (see for example FIG. 3F). This means that the color filters, realized by the etalon, are the closest to the de-facto color spectra standard.

Figure 3B:
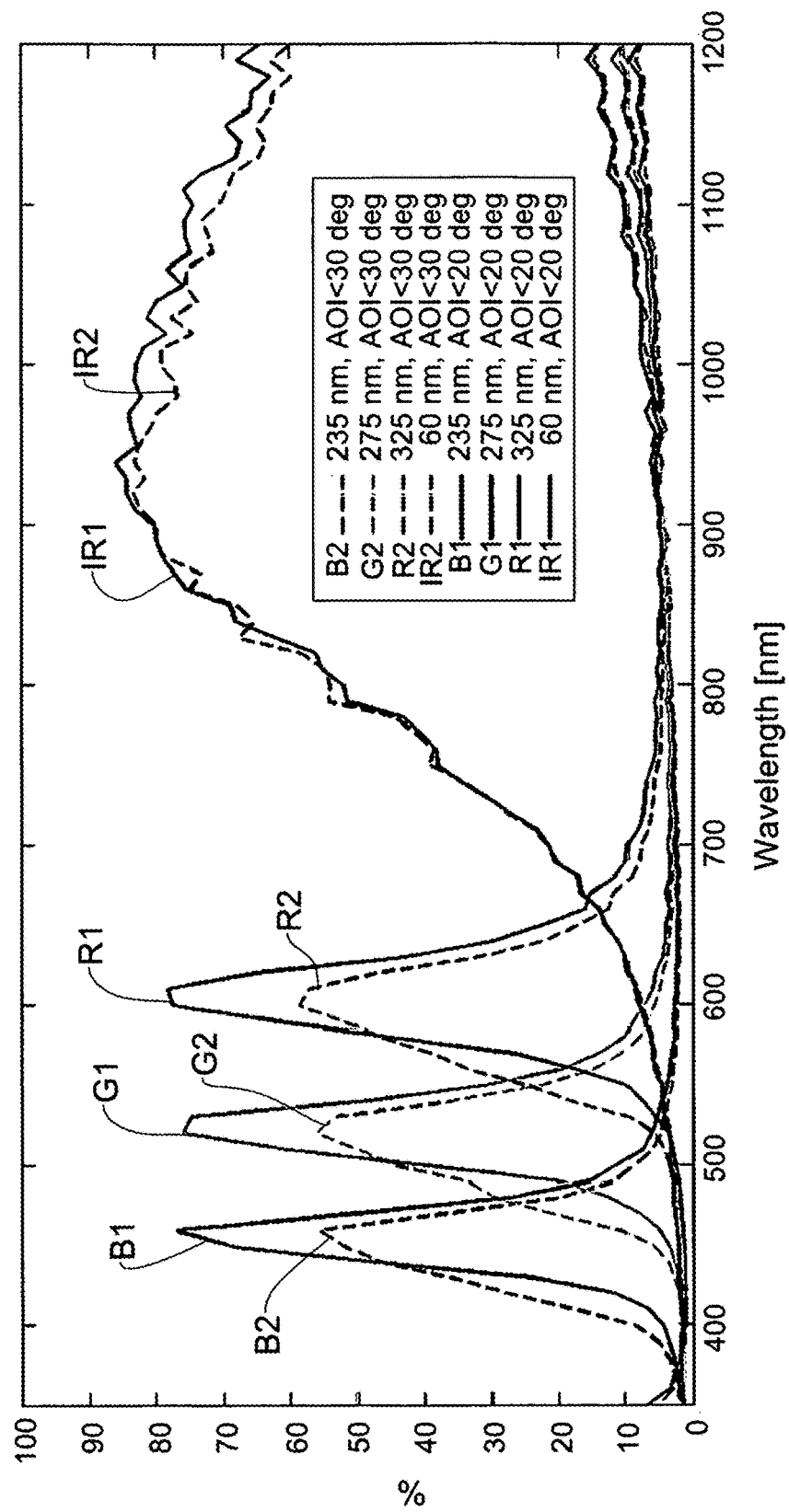
FIG. 3B shows graphs of R-G-B and IR spectral transmission profiles (filtering curves) of an etalon configured according to an embodiment of the present invention.

FIG. 3B illustrates the resulting spectral transmission curves (complementary to the spectral filtering curves) of the etalon 120 of the embodiment of FIG. 3A, when respectively tuned for four central wavelengths centered to match the IR and R-G-B spectrum.

In this regards, it is noted that the graphs of FIG. 3B were obtained without the anti-reflective coating AR1 of the etalon 120 (which perform an IR cutoff filtration) but including only anti-reflective coating AR2 on mirror M2. To this end, the graphs in FIG. 3B includes spectral transmission curve also in the NIR IR.

Two, solid and dashed transmission graphs, are illustrated for each of the IR and R-G-B wavelengths wherein the solid graph corresponds to transmission of light incident on the etalon with an angle of incidence (AOI) of within the range within ±20° from the normal, and the dashed graph corresponds to transmission of light incident on the etalon with an AOI within ±30° from the normal. Although only one AR coating is used (AR2) in this example, still the etalon provides good transmission efficiency (low losses) in the order of 80% transmission for AOI up to 20° and in the order of 60% transmission for AOI up to 30°. In some embodiments of the present invention AR coating AR1 is also used (with or without the IR cutoff filter) in order to further improve the etalon's efficiency. The particular AR coating AR2 used of the present example is described in more details below.

Figure 3C:
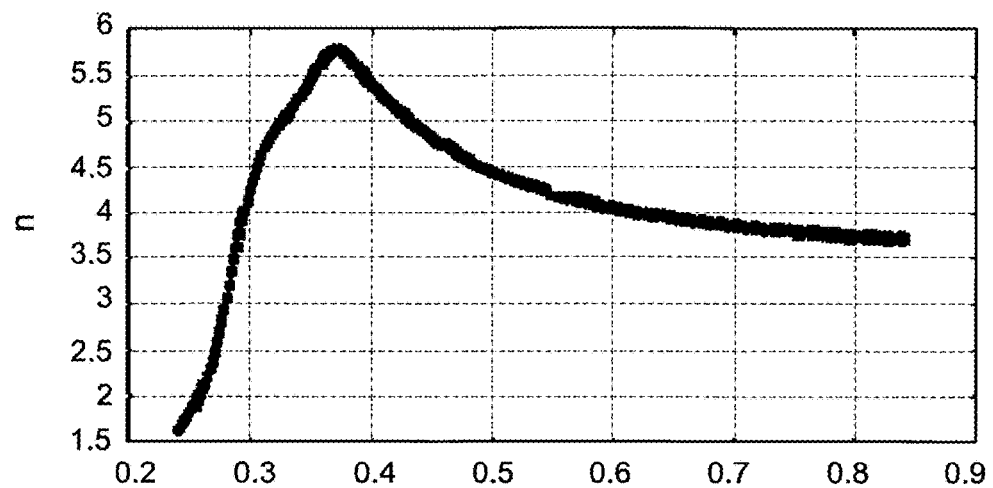
FIG. 3C illustrates the refractive index profile of a polysilicon material which is used in the etalon mirrors according to some embodiments of the present invention to obtain a tunable etalon having a sufficiently thin form factor and which is tunable to match the standard RGB color profiles with sufficiently wide FSR.

Graphs B1 and B2 correspond to spacing of 235 nm between the etalon mirrors, which resulted with spectral transmission peak in the blue wavelength regime (e.g. near a wavelength of 450 nm). Graphs G1 and G2 correspond to the spacing of 275 nm between the etalon mirrors which resulted with spectral transmission peak in the green wavelength regime (e.g. close to a wavelength of 530 nm). In graphs R1 and R2 the spacing between the etalon mirrors was set to 325 nm resulting in spectral transmission peak in the red wavelength regime (e.g. close to a wavelength of 600 nm). In graphs IR1 and IR2 the spacing between the etalon mirrors was set to 60 nm resulting in spectral transmission peak in the NIR infrared wavelength regime (e.g. near about wavelength of 950 nm). The calculation of the transmission spectra of the etalon is based on the dispersion of the refraction index of the Poly-silicon material which is illustrated in a self-explanatory manner in the graph of FIG. 3C.

Figure 3D:
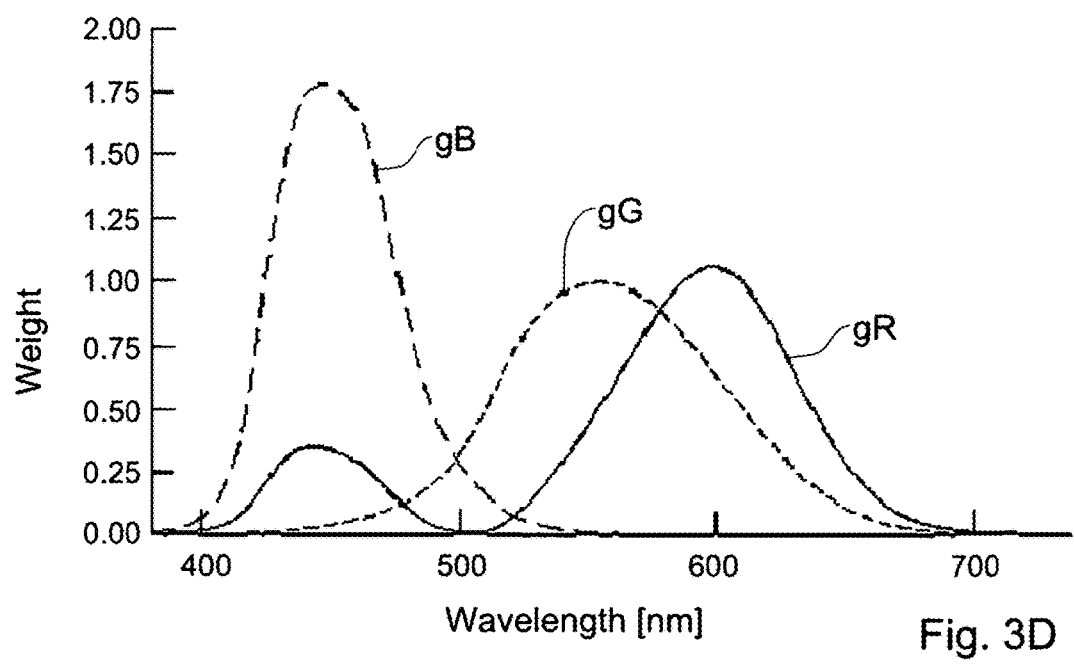
FIG. 3D shows spectral profiles of RGB colors according to the International Commission on Illumination (CIE) color space (also known as the CIE 1931 color space standard.

The spectral filtering results exhibit a good fit to the CIE 1931 transmission spectra. To this end, FIG. 3D illustrates three graphs gR, gG, and gB showing the CIE's standard R-G-B colors respectively. As seen from FIG. 3B, the graphs R1, G1, and B1 as well as the graphs R2, G2, and B2 show that the etalon 120 R-G-B colors transmission spectra which fits that of the standard colors CIE 1931 shown in FIG. 3D, with relatively high efficiency for AOIs of up to 30°. As also shown in these graphs sufficient FSR is obtained providing good color separation (namely side lobes of the spectra remain mainly out of the wavelength band to be detected, in this case visual and NIR band). Additionally, sufficiently wide FWHM of the peaks is obtained to mimic the wide peaks of the standard RGB spectra and the overlap between them (namely peaks exhibiting wide enough spectral variations).

It should be understood that the transmission curves of the etalon may further be modified (e.g. to fit specific requirements/preferences of camera designers). For example the etalon properties may be modified by changing the internal coating material IC (e.g. the Poly-silicon material) or its thickness to affect the width of the spectral peak of the etalon (hence, affecting the etalon's finesse). Also, the BK7 glass may be replaced by another glass, and the central wavelength to which the etalon is tuned may be moved by modifying the spacing between the etalon's mirrors (changing the air spacing).

According to some embodiments of the present invention the mirrors M1 and M2, or at least one of them, are also coated with specifically selected anti-reflective (AR) coatings. For example, in the etalon 120 of FIG. 3A AR coatings AR1 and AR2 are used. The purpose of the external coatings AR1 and AR2 is to reduce light reflection due to refraction index difference and improve etalon transmission efficiency.

Thus the coatings are selected to minimize losses and possibly also for replacing the conventional IR-cut filter used in conventional image sensors of the visual regime. In the present example the BK7 glass mirrors M1 and M2 are each coated with AR coating from the outside and, from the inside, with a thin high-refraction-index coating layer IC of poly-silicon material having refractive index of about n=3.8.

It should be noted that the total thickness of the etalon of the present invention is in the order of about ~400 μm. Accordingly, in some cases the etalon might not be integrated between the micro-lens and the sensor (e.g. in replacement of the CFA of the sensor (whose thickness is conventionally much lower ~1 μm). However in such cases the filter should be placed outside the micro-lens array of the sensor, for example it may replace the IR-cut filter of the sensor.

To this end, according to some embodiments of the present invention the etalon is also configured for low pass filtering of light with an IR-cutoff filter (with ~700 nm cut-off). This may be achieved by utilizing specific AR coating on the etalon with IR cutoff properties.

For example, the left-hand side glass coating AR1 may implement anti-reflection (air to BK7 interface) and band-pass filter at 400 nm-700 nm (operating as IR cut-off filter), while the AR2 coating may only apply anti-reflection properties of BK7 to air interface in the range of 400 nm-700 nm.

In the present example the following AR coatings are used (these are described in more detail in the titled *Optical System Design* book by Fischer, R. E.; Tadic-Galeb, B.; Yoder, P. R. (2008)):
For AR1 coating:
  Air|1.07 L|(2H2 L)8|2.6H|2.64 L|2.8H|2.46 L|2.14H|2.2 L|(2.6H2.6 L)3|2.6H|2.74 L|(2.9H2.9 L)5|2.74H|3.08 L|0.4H|BK7
  Where:
  L=75.8800 nm, H=92.6753 nm $n_L$=1.463, $n_H$=2.239
  The total coating width is 6.1 μm.
For AR2 coating:
  |BK7|M|2H|L|Air
  Where:
  L=92.1243 nm, M=78.2689 nm, H=59.9718 nm
  $n_L$=1.384, $n_M$=1.629, $n_H$=2.126
  The total coating width is 0.3 μm.

Figure 4A:
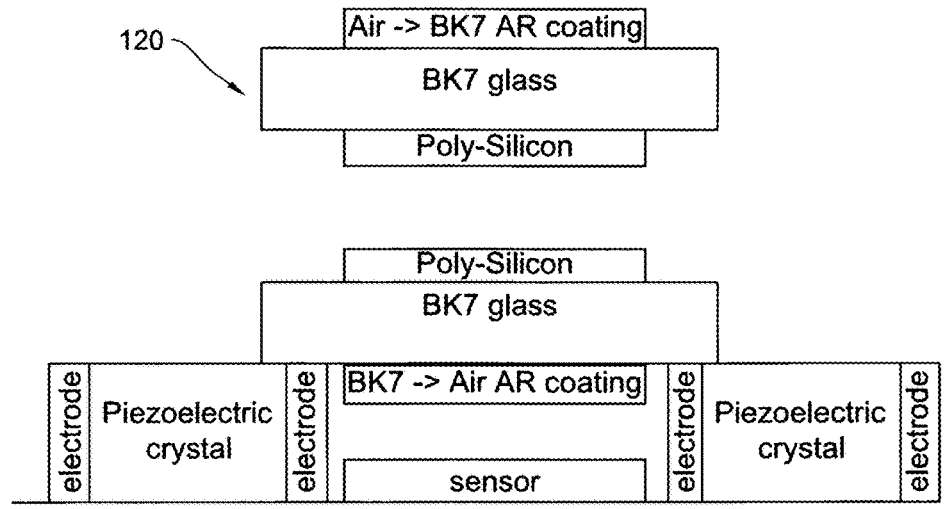
FIGS. 4A and 4B illustrate two mechanical configurations for the tunable spectral filter according to two embodiments of the present invention utilizing piezoelectric actuation for adjusting the spacing between the etalon mirrors.
Figure 4B:
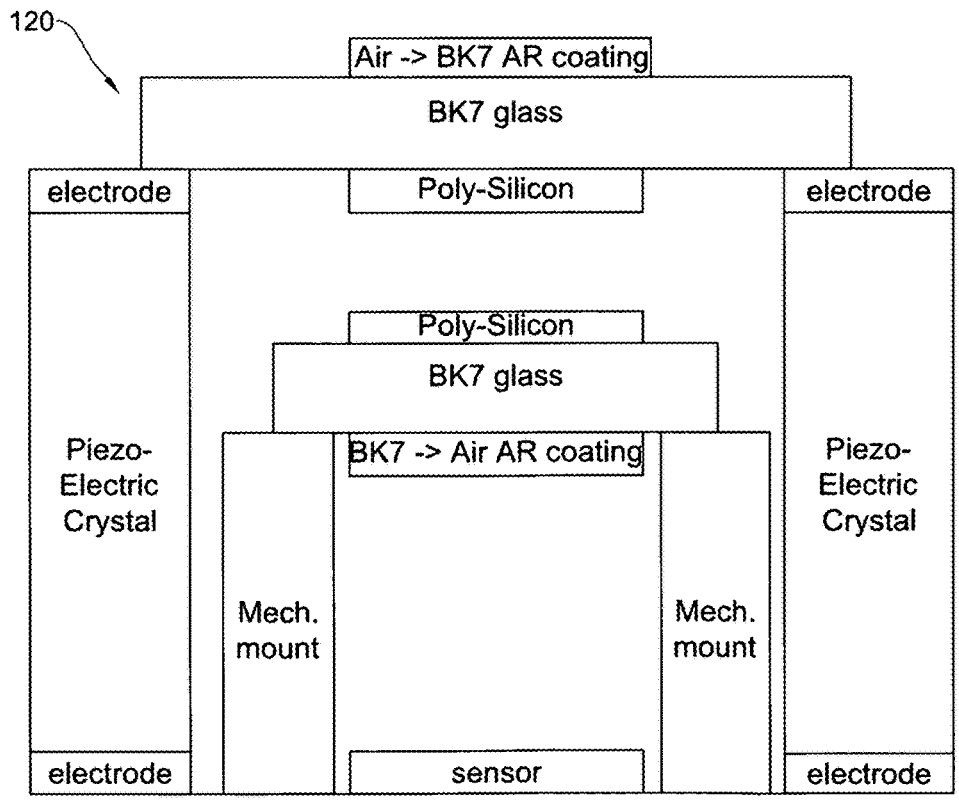

There are several possible configurations for mounting the etalon mirrors on mechanical actuators for providing accurate and fast tuning of the etalon. For example FIGS. 4A and 4B are two schematic self explanatory illustrations of two possible mechanical configurations of the etalon 120 illustrated in FIG. 3A in which accurate control of the distance d between the etalon mirrors is achieved by mounting one of the mirrors on piezoelectric actuators. The actuators include properly selected piezoelectric crystals with predetermined dimensions configured for providing the desired movement range for controlling spacing between the mirrors. The piezoelectric crystals are coupled to electrodes through which the controller (110 in FIG. 1A) controls the distance d. FIG. 4A shows a configuration in which the etalon's mirror that is located proximate to the sensor is mechanically coupled to the piezoelectric actuators. The second mirror of the etalon is fixedly mounted (this mount is not specifically illustrated in the figure). In FIG. 4B shows a configuration in which the etalon's mirror located proximate to the sensor is fixedly mounted by a mechanical mount and the mirror that is more distant from the sensor, is mechanically coupled to the piezoelectric actuators.

As indicated above, certain desirable optical properties of making the etalon configuration of the present invention specifically suitable for imaging applications are achieved by utilizing high-refractive index inner coatings on the internal sides of the mirrors of the etalon. E.g., coatings having refractive index of at least n>2.3 and more preferably n>3.0. To this end the inventors of the present invention have simulated the spectral transmission of several coating materials having high refractive indices including for example: Poly-Silicon, Titanium Oxide (TiO2), Gallium Phosphide (GaP), GaAs, Barium Titanium Oxide (BaTiO2), Bismuth Titanium Oxide (Bi4Ti3O12), which of a given wavelengths of 520 nm are respectively associated with the following refractive indices: 4.2, 2.6, 3.5, 4.2, 2.5, 2.7, respectively. The following table shows the distance between the etalon mirrors which provide filtration curves estimating the RGB colors, when the mirrors are coated with each of the above listed coatings

|  | RED | GREEN | BLUE |
| --- | --- | --- | --- |
| Poly Silicon | 340 nm | 285 nm | 245 nm |
| TiO2 | 355 nm | 310 nm | 270 nm |
| GaP | 355 nm | 295 nm | 255 nm |
| BaTiO2 | 355 nm | 310 nm | 270 nm |
| Bi4Ti3O12 | 360 nm | 310 nm | 370 nm |

Figure 5A:
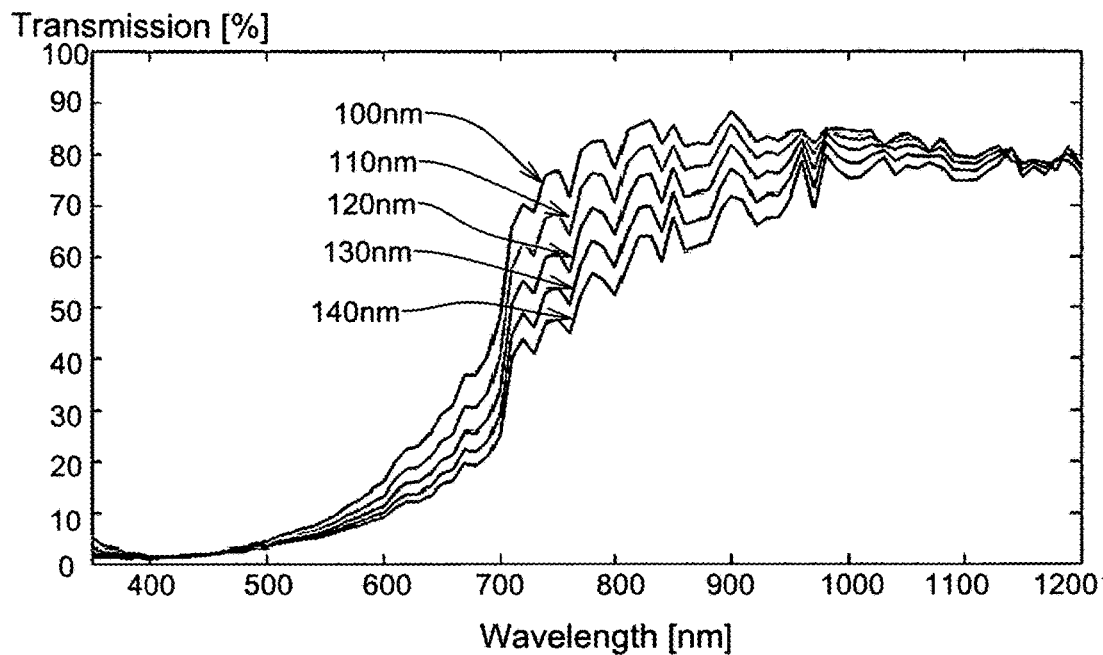
FIGS. 5A and 5B respectively show graphically the NIR and white spectral transmission curves obtained by an etalon configured with poly-silicon coating.
Figure 5B:
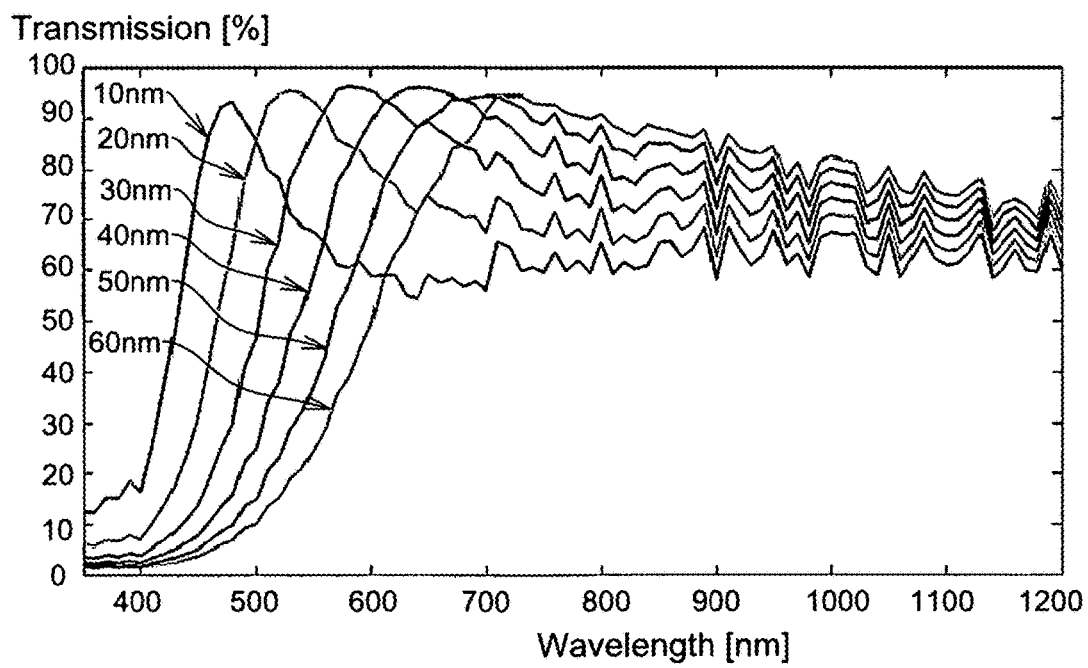

FIGS. 5A and 5B are self explanatory graphical illustrations of IR and white transmission spectra's respectively, which are obtained by an etalon configured according to an embodiment of the present invention, with Poly-Silicon coating on the mirrors of the etalon. As shown in FIG. 5A, NIR transmission spectrum is obtained when the spacing between the etalon mirrors ranges between 100 to 140 nm. A white transmission spectrum, shown in FIG. 5B is obtained when the etalon mirrors are spaced by 10 to 60 nm. Thus, according to the present invention the etalon may be used to obtain several frames providing color information (e.g. two or more frames corresponding to the RGB colors) as well as additional frames corresponding to the IR and/or white spectral curves. The later may be obtained with relatively high intensity thus providing for reducing the noise from the final image and/or improving its image quality and/or dynamic range. It should be understood that similar White and NIR transmission spectra may also be obtained with the other coatings discussed above.

Thus various embodiments of the present invention provide a novel imaging system and method (pipeline) for colored imaging by sequential acquisition of monochrome images with respectively predetermined (predefined/adaptive) integration times and fusion of such images to form a high quality colored image. Also various embodiments of the present invention provide a novel tunable etalon spectral filter particularly suited for capturing colored images in the visual and/or visual-NIR spectra. The etalon spectral filter provides sufficiently wide full-width half maximum of the transmission peak (e.g. FWHM about 50-80 nm) and broad enough free spectral ranges (FSR>300 nm) so as to produce accurate colored images. Additionally, the etalon may be configured with a small thickness form factor (e.g. in the order of about 1 mm or even less) which can be fitted in the optical axis of compact/miniature imagers while also providing fast and accurate spectral tuning.

The invention claimed is:

1. An imaging system for acquisition of color images comprising: an image sensor; a tunable spectral filter arranged in an optical path of light propagation towards said image sensor; and a controller connected to said image sensor and to said tunable spectral filter, and adapted for generating a colored image by sequentially operating said tunable spectral filter for sequentially filtering light passing towards the image sensor with three or more different spectral filtering curves during three or more corresponding integration time durations; wherein said tunable spectral filter is an etalon configured such that transmission peaks of said spectral curves have full-width-half maximum (FWHM) in the range of about 50 to 80 nm and free spectral range of at least 300 nm, said etalon comprising a pair of reflective surfaces, at least one of the reflective surfaces comprising at least one of the following: (i) a layer of high refractive index of at least n=2.3, or (ii) a layer of low refractive index, smaller than n=1; thereby providing that a thickness of said etalon does not exceed 1 mm.

2. The system of claim 1 wherein said controller is configured and operable for operating said sensor during said three or more integration time durations for acquiring three or more images of the light of said three or more spectral filtering curves respectively; and receiving and processing readout data indicative of said three or more images from the sensor and generating data indicative of a colored image including information on intensities of at least three colors in each pixel of the colored image.

3. The system of claim 1, wherein the controller is operable for adaptively determining at least one of the following: said three or more different spectral filtering curves, and the durations of said integration times, based on the scene to be imaged.

4. The system of claim 3 wherein the controller is operable for carrying out a calibration stage prior to said generation of the colored image; said calibration stage comprising:
tuning said spectral filter to at least one spectral filtering curve of said three or more different spectral filtering curves,
obtaining and processing readout data from the sensor corresponding to said light filtered by said at least one spectral filtering curve, and estimating the intensity of light with said spectral filtering curve in the scene;
utilizing said intensity to determine an optimized integration time duration of capturing an image of light filtered by said spectral filtering curve.

5. The system of claim 1, wherein the controller is operable for estimating brightness of at least one image of said three or more images of said three or more spectral filtering curves, and upon determining said brightness is below a certain threshold, operating said tunable spectral filter and said imager for capturing another image of a similar or same spectral filtering curve.

6. The system of claim 1, wherein said processing of the readout data indicative of said three or more images from the sensor comprises applying image fusion processing to said readout data to generate said colored image; said image fusion algorithms include at least one of the following:
processing said three or more images to determine spatial registration between the images;
normalizing the respective intensities of the three or more images based on at least one of the following: said integration time durations of the respective images, said spectral filtering-curves corresponding to said images, and a sensitivity of the sensor for wavelengths corresponding to said spectral filtering-curves; and
merging said data from said three or more images to generate data indicative of said colored image.

7. The system of claim 1, wherein said controller is adapted for operating said tunable spectral filter such that said three or more spectral filtering curves include at least three spectral filtering curves corresponding to at least three specific colors in the visual spectral regime and at least one additional spectral filtering curve adapted for transmitting relatively high light intensity through said filter as compared to a light intensity transmitted through said filter when tuned to said at least three spectral filtering curves.

8. The system of claim 1, wherein said three or more different spectral filtering curves include three RGB spectral filtering curves in the visual spectral regime, and wherein said layer of high reflective index having refractive index n>3, thereby improving a match between the spectral transmission curves provided by said etalon and conventional RGB colors.

9. The system of claim 1, comprising a telecentric optical module located in said optical path of light propagating towards said tunable spectral filter; said telecentric lens is configured and operable for reducing at least one of the following: spatial variation in of chief ray angles of light beams that incident on said tunable spectral filter, and an angular subtense of said light beams; thereby improving spatial uniformity of the spectral filtration operation of said tunable spectral filter.

10. An imaging system for acquisition of color images comprising:
an image sensor;
a tunable spectral filter arranged in an optical path of light propagation towards said image sensor; and
a control system connected to said image sensor and to said tunable spectral filter; said control system is adapted for generating a colored image by sequentially operating said tunable spectral filter for sequentially filtering light passing towards the image sensor with three or more different spectral filtering curves during three or more corresponding integration time durations, grabbing three or more images corresponding to said three or more different spectral filtering curves from the image sensor and processing said images to produce said colored image;
wherein said three or more spectral filtering curves include at least three spectral filtering curves corresponding to at least three specific colors in the visual spectral regime and at least one additional spectral filtering curve selected for transmitting relatively high light intensity through the tunable spectral filter as compared to a light intensity transmitted through said filter when tuned to said at least three spectral filtering curves; said additional spectral filtering curve provides at least one image of said three or more images with improved dynamic range and reduced noise content; and
wherein the control system is adapted for utilizing said at least one image for implementing Bilateral filtering processing of said three or more images for at least one of the following: (i) reducing noise content from said colored image; and (ii) improving a dynamic range of said colored image.

11. The system of claim 10, wherein said at least three specific colors includes the three RGB colors; and wherein said at least one additional spectral filtering curve include at least one of the following: (i) a white spectral curve used for obtaining high intensity images within the visible spectrum; and (ii) a NIR spectral curve used for obtaining high intensity images in certain imaging conditions.

12. A method for color image acquisition comprising:
sequentially operating the tunable spectral filter arranged in an optical path of light propagation towards an image sensor for sequentially filtering light passing towards said image sensor with three or more different spectral filtering curves corresponding to three or more colors during three or more respective integration time durations;

wherein the method comprising utilizing tunable spectral filter configured to provide said spectral filtering curves with wide transmission peaks having full-width-half maximum (FWHM) in the range of about 50 to 80 nm, and free spectral range of at least 300 nm; and wherein said tunable spectral filter has an etalon configuration and includes a pair of reflective surfaces wherein at least one of the reflective surfaces comprises at least one of the following: (i) a layer of high reflective index of at least n=2.3, and (ii) a layer of refractive index smaller than 1; thereby providing wide transmission peaks of said spectral curves with FWHM in the range of about 50 to 80 nm.

13. The method of claim 12, further comprising operating said sensor during said three or more integration time durations defined per each of said three or more spectral filtering curves, for respectively acquiring three or more images of the light of said three or more colors; and receiving and processing readout data indicative of said three or more images from the sensor and generating data indicative of a colored image including information on intensities of at least three colors in each pixel of the image.

14. The method of claim 12, comprising performing a calibration stage prior to an actual imaging of a scene, said calibration stage comprises capturing one or more images indicative of intensities of one or more colors in said scene and processing said one or more images to determine, based on said scene, one or more of the following: said three or more colors to be imaged during said actual imaging of the scene, and said integration time durations.

15. The method of claim 14 wherein said calibration stage comprises:

sequentially tuning said spectral filter to spectral filtering curves corresponding to said one or more colors, processing readout data from the sensor to estimate intensities of the three or more colors in the scene; and utilizing said estimated intensities to determine integration times for imaging light arriving from the scene in each of said three or more colors.

16. The method of claim 12, comprising estimating brightness of at least one image associated with one of said three or more colors, and upon determining said brightness is below a certain threshold, operating said tunable spectral filter and said sensor for capturing another image of a similar or same color.

17. The method of claim 12, comprising applying image fusion processing to said three or more images and generating said colored image; said image fusion algorithms include at least one of the following:

determining spatial registration between the three or more images;

normalizing the respective intensities of the three or more images based on at least one of the following: said integration times of the respective images, said spectral filtering-curves corresponding to said images respectively, and a sensitivity of the sensor for wavelengths corresponding to said spectral filtering-curves; and merging said data from said three or more images to generate data indicative of said colored image.

18. The method of claim 17 wherein said merging includes color interpolation for converting between the spectral filtering-curves associated with said three or more images and a certain color palette of the colored image.

19. The method of claim 12, wherein said acquiring three or more images comprising acquiring at least three images with said tunable spectral filter tuned to at least three spectral filter curves corresponding to at least three specific colors in the visual spectral regime, and at least one additional image with said tunable spectral filter tuned to sat least one additional spectral filter curve transmitting high light intensity relative to said at least three spectral filtering curves; said additional image is thereby provided with improved dynamic range and reduced noise content; and wherein the method further comprises utilizing said at least one additional image for carrying out a multi-frame filtering process to: (i) reducing a noise content from said colored image and/or (ii) improving a dynamic range of said colored image.

20. The method of claim 19 wherein said at least one additional spectral filtering curve include at least one of the following: (i) a white spectral curve used for obtaining high intensity images; and (ii) a NIR spectral curve used for obtaining high intensity images in dark imaging conditions.

21. The method according to claim 12, comprising utilizing at least a telecentric optical module placed along an optical path of light towards said tunable spectral filter, thereby improving the spatial uniformity of spectral transmission through said filter.

* * * * *